(12) United States Patent
Ying et al.

(10) Patent No.: US 8,617,513 B2
(45) Date of Patent: *Dec. 31, 2013

(54) MESOSTRUCTURED ZEOLITIC MATERIALS AND METHODS OF MAKING AND USING THE SAME

(75) Inventors: Jackie Y. Ying, Winchester, MA (US); Javier García-Martínez, Alicante (ES)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/505,843

(22) Filed: Jul. 20, 2009

(65) Prior Publication Data

US 2009/0326177 A1 Dec. 31, 2009

Related U.S. Application Data

(62) Division of application No. 10/830,714, filed on Apr. 23, 2004, now Pat. No. 7,589,041.

(51) Int. Cl.
*B01J 29/06* (2006.01)
*C01B 39/02* (2006.01)
*C10G 11/05* (2006.01)

(52) U.S. Cl.
USPC ............... 423/716; 423/700; 502/63; 502/64; 502/67; 502/69; 502/79; 208/113; 208/114; 208/118; 208/119; 208/122

(58) Field of Classification Search
USPC ............ 502/63, 64, 67, 69, 79; 423/700, 716; 208/113, 114, 118, 119, 122
See application file for complete search history.

(56) References Cited

U.S. PATENT DOCUMENTS

| | | |
|---|---|---|
| 3,709,853 A | 1/1973 | Karapinka |
| 3,864,280 A | 2/1975 | Schneider |
| 4,016,218 A | 4/1977 | Haag et al. |
| 4,088,671 A | 5/1978 | Kobylinski |
| 4,564,207 A | 1/1986 | Russ et al. |
| 4,637,623 A | 1/1987 | Bubik |
| 4,689,314 A | 8/1987 | Martinez et al. |
| 4,704,375 A | 11/1987 | Martinez et al. |
| 4,816,135 A | 3/1989 | Martinez et al. |
| 4,836,737 A | 6/1989 | Holmes et al. |
| 4,857,494 A | 8/1989 | Martinez et al. |
| 4,891,458 A | 1/1990 | Innes et al. |
| 4,894,354 A | 1/1990 | Martinez et al. |
| 4,968,405 A | 11/1990 | Wachter |
| 5,013,699 A | 5/1991 | Vassilakis et al. |
| 5,051,385 A | 9/1991 | Wachter |
| 5,061,147 A | 10/1991 | Nespor |
| 5,095,169 A | 3/1992 | Skeels et al. |
| 5,116,794 A | 5/1992 | Skeels et al. |
| 5,134,242 A | 7/1992 | Le et al. |
| 5,134,243 A | 7/1992 | Bhore et al. |
| 5,160,033 A | 11/1992 | Vassilakis et al. |
| 5,200,058 A | 4/1993 | Beck et al. |
| 5,207,892 A | 5/1993 | Vassilakis et al. |
| 5,208,197 A | 5/1993 | Vassilakis et al. |
| 5,221,648 A | 6/1993 | Wachter |
| 5,232,580 A | 8/1993 | Le et al. |
| 5,254,327 A | 10/1993 | Martinez et al. |
| 5,256,277 A | 10/1993 | Del Rossi et al. |
| 5,258,570 A | 11/1993 | Skeels et al. |
| 5,260,501 A | 11/1993 | Bhore et al. |
| 5,288,393 A | 2/1994 | Jessup et al. |
| 5,308,475 A | 5/1994 | Degnan et al. |
| 5,344,553 A | 9/1994 | Shih |
| 5,347,060 A | 9/1994 | Hellring et al. |
| 5,360,774 A | 11/1994 | Martinez et al. |
| 5,393,718 A | 2/1995 | Skeels et al. |
| 5,401,384 A | 3/1995 | Martinez et al. |
| 5,458,929 A | 10/1995 | Earls et al. |
| 5,510,431 A | 4/1996 | Earls et al. |
| 5,538,710 A | 7/1996 | Guo et al. |
| 5,601,798 A | 2/1997 | Cooper et al. |
| 5,614,453 A | 3/1997 | Occelli |
| 5,628,978 A | 5/1997 | Tejada et al. |
| 5,659,099 A | 8/1997 | Skeels et al. |
| 5,672,556 A | 9/1997 | Pinnavaia et al. |
| 5,712,402 A | 1/1998 | Pinnavaia et al. |
| 5,744,673 A | 4/1998 | Skeels et al. |
| 5,770,040 A | 6/1998 | Tejada et al. |
| 5,785,946 A | 7/1998 | Pinnavaia et al. |
| 5,786,294 A | 7/1998 | Sachtler et al. |

(Continued)

FOREIGN PATENT DOCUMENTS

FR 2802120 6/2001
JP 2004-143026 5/2004

(Continued)

OTHER PUBLICATIONS

Jacobsen et al., "Mesoporous Zeolite Single Crystals", J. Am. Chem. Soc., 2000, 122, 7116-7117.*
Ogura et al., "Formation of Uniform Mesopores in ZSM-5 Zeolite through Treatment in Alkaline Solution", Chemistry Letters, 2000, 882-883.*
Tao et al., "ZSM-5 monolith of Uniform Mesoporous Channels", J. Am. Chem. Soc., 2003, 125, 6044-6055.*
Goto, Y., "Mesoporous Material from Zeolite," Journal of Porous Materials 9, 2002, pp. 43-48.
Poladi, et al., "Synthesis, Characterization, and Catalytic Properties of a Microporous/Mesoporous Material, MMM-1", Journal of Solid State Chemistry vol. 167, 2002, pp. 363-369.
Xia, et al., "On the Synthesis and Characterization of ZSM-5/MCM-48 Aluminosilicate Composite Materials" The Royal Society of Chemistry, School of Chemistry, University of Nottingham, Feb. 2004, 8 pages.

(Continued)

*Primary Examiner* — Elizabeth Wood
(74) *Attorney, Agent, or Firm* — Hovey Williams LLP

(57) ABSTRACT

One aspect of the present invention relates to mesostructured zeolites. The invention also relates to a method of preparing mesostructured zeolites, as well as using them as cracking catalysts for organic compounds and degradation catalysts for polymers.

29 Claims, 22 Drawing Sheets

(56) References Cited

U.S. PATENT DOCUMENTS

| | | | |
|---|---|---|---|
| 5,795,559 A | 8/1998 | Pinnavaia et al. | |
| 5,800,800 A | 9/1998 | Pinnavaia et al. | |
| 5,800,801 A | 9/1998 | Tejada et al. | |
| 5,840,264 A | 11/1998 | Pinnavaia et al. | |
| 5,840,271 A | 11/1998 | Carrazza et al. | |
| 5,849,258 A | 12/1998 | Lujano et al. | |
| 5,855,864 A | 1/1999 | Pinnavaia et al. | |
| 5,858,457 A | 1/1999 | Brinker et al. | |
| 5,892,080 A | 4/1999 | Alberti et al. | |
| 5,902,564 A | 5/1999 | Lujano et al. | |
| 5,952,257 A | 9/1999 | Tejada et al. | |
| 5,958,367 A | 9/1999 | Ying et al. | |
| 5,958,624 A | 9/1999 | Frech et al. | |
| 5,961,817 A | 10/1999 | Wachter et al. | |
| 5,985,356 A | 11/1999 | Schultz et al. | |
| 5,993,768 A | 11/1999 | Zappelli et al. | |
| 6,004,617 A | 12/1999 | Schultz et al. | |
| 6,015,485 A | 1/2000 | Shukis et al. | |
| 6,022,471 A | 2/2000 | Wachter et al. | |
| 6,027,706 A | 2/2000 | Pinnavaia et al. | |
| 6,096,828 A | 8/2000 | DePorter et al. | |
| 6,106,802 A | 8/2000 | Lujano et al. | |
| 6,139,721 A | 10/2000 | Baldiraghi et al. | |
| 6,162,414 A | 12/2000 | Pinnavaia et al. | |
| 6,193,943 B1 | 2/2001 | Pinnavaia et al. | |
| 6,204,424 B1 | 3/2001 | Yadav et al. | |
| 6,299,855 B1 | 10/2001 | Lujano et al. | |
| 6,319,872 B1 | 11/2001 | Manzer et al. | |
| 6,334,988 B1 | 1/2002 | Gallis et al. | |
| 6,391,278 B1 | 5/2002 | Pinnavaia et al. | |
| 6,410,473 B1 | 6/2002 | Pinnavaia et al. | |
| 6,413,489 B1 | 7/2002 | Ying et al. | |
| 6,413,902 B1 | 7/2002 | Pinnavaia et al. | |
| 6,419,820 B1 | 7/2002 | Bogdan et al. | |
| 6,476,085 B2 | 11/2002 | Manzer et al. | |
| 6,476,275 B2 | 11/2002 | Schmidt et al. | |
| 6,485,702 B1 | 11/2002 | Lujano et al. | |
| 6,489,168 B1 | 12/2002 | Wang et al. | |
| 6,495,487 B1 | 12/2002 | Bogdan | |
| 6,524,470 B1 | 2/2003 | Kasztelan et al. | |
| 6,538,169 B1 | 3/2003 | Pittman et al. | |
| 6,544,923 B1 | 4/2003 | Ying et al. | |
| 6,548,440 B1 | 4/2003 | Pham et al. | |
| 6,558,647 B2 | 5/2003 | Lacombe et al. | |
| 6,580,003 B2 | 6/2003 | Deng et al. | |
| 6,583,186 B2 | 6/2003 | Moore, Jr. | |
| 6,585,952 B1 | 7/2003 | Pinnavaia et al. | |
| 6,592,764 B1 | 7/2003 | Stucky et al. | |
| 6,620,402 B2 | 9/2003 | Jacobsen et al. | |
| 6,623,967 B1 | 9/2003 | Willson, III | |
| 6,649,413 B1 | 11/2003 | Schultz et al. | |
| 6,669,924 B1 | 12/2003 | Kaliaguine et al. | |
| 6,702,993 B2 | 3/2004 | Pinnavaia et al. | |
| 6,706,169 B2 | 3/2004 | Pinnavaia et al. | |
| 6,706,659 B2 | 3/2004 | Gillespie et al. | |
| 6,710,003 B2 | 3/2004 | Jan et al. | |
| 6,746,659 B2 | 6/2004 | Pinnavaia et al. | |
| 6,756,515 B2 | 6/2004 | Rende et al. | |
| 6,762,143 B2 | 7/2004 | Shan et al. | |
| 6,770,258 B2 | 8/2004 | Pinnavaia et al. | |
| 6,793,911 B2 * | 9/2004 | Koegler et al. | 423/716 |
| 6,797,153 B1 | 9/2004 | Fukuyama et al. | |
| 6,797,155 B1 | 9/2004 | Chester et al. | |
| 6,800,266 B2 | 10/2004 | Pinnavaia et al. | |
| 6,809,061 B2 | 10/2004 | Bogdan et al. | |
| 6,811,684 B2 | 11/2004 | Mohr et al. | |
| 6,814,943 B2 | 11/2004 | Radcliffe et al. | |
| 6,818,589 B1 | 11/2004 | Gillespie | |
| 6,841,143 B2 | 1/2005 | Inagaki et al. | |
| 6,843,906 B1 | 1/2005 | Eng | |
| 6,843,977 B2 | 1/2005 | Pinnavaia et al. | |
| 6,846,546 B2 | 1/2005 | Kuroda et al. | |
| 6,866,925 B1 | 3/2005 | Chane-Ching | |
| 6,869,906 B2 | 3/2005 | Pinnavaia et al. | |
| 6,998,104 B2 | 2/2006 | Tao et al. | |
| 2001/0031241 A1 | 10/2001 | Lacombe et al. | |
| 2001/0042440 A1 | 11/2001 | Miyazawa et al. | |
| 2002/0018747 A1 | 2/2002 | Pinnavaia et al. | |
| 2002/0131930 A1 | 9/2002 | Pinnavaia et al. | |
| 2003/0054954 A1 | 3/2003 | Chane-Ching et al. | |
| 2003/0147805 A1 * | 8/2003 | Koegler et al. | 423/700 |
| 2004/0067842 A1 | 4/2004 | Pinnavaia et al. | |
| 2004/0138051 A1 | 7/2004 | Shan et al. | |
| 2004/0179996 A1 | 9/2004 | Shan et al. | |
| 2005/0074396 A1 | 4/2005 | Takahashi et al. | |
| 2006/0078487 A1 | 4/2006 | Endo et al. | |

FOREIGN PATENT DOCUMENTS

| | | |
|---|---|---|
| WO | 01/17901 | 3/2001 |
| WO | 01/38223 | 5/2001 |
| WO | WO 01/38223 | 5/2001 |
| WO | 2006/031259 | 3/2006 |
| WO | 2006/038912 | 4/2006 |

OTHER PUBLICATIONS

Bridgwater, A.V., "Castalysis in Thermal Biomass Conversion", Sep. 1993, 43 pages.

Groen, J.C., "On the introduction of intracrystalline mesoporosity in zeolites upon desilication in alkaline medium," Elsevier, Microporous and Mesoporous Materials 69 (2004) pp. 29-34.

Inagaki, et al., "An Ordered Mesoporous Organosilica Hybrid Material with a Crystal-like Wall Structure", Nature, vol. 416, Mar. 2002, pp. 304-307.

Lima et al., "Diesel-like Fuel Obtained by Pyrolysis of Vegetable Oils", Science Direct, Journal of Analytical and Applied Pyrolysis, Dec. 2003, pp. 987-996.

Parasad et al., "Catalytic Conversion of Canola Oil to fuels and Chemical Feedstocks Part I. Effect of Process Conditions on the Performance of HZSM-5 Catalyst" University of Saskatchewan, The Canadian Journal of chemical Engineering, vol. 64, Apr. 1986, pp. 278-284.

Weisz P.B. et al., "Catalytic Production of High-Grade Fuel (Gasoline) from Biomass Compounds by Shape-Selective Catalysis" AAAS, vol. 206, Oct. 1979, pp. 57-58.

Guo et al. "Characterization of Beta/MCM-41 Composite Molecular Sieve Compared with the Mechanical Mixture" Microporous and Mesoporous materials vols. 44-45; 2001; pp. 427-434.

Tao et al. "ZSM-5 Monolith of Uniform Mesoporous Channels" Material Sciences, Chiba University, J. Am. Chem. Soc., Japan, 2003, pp. 6044-6045.

Al-Khattaf, S., et al., "The role of diffusion in alkyl-benzenes catalytic cracking" Appl. Cata/. A: Gen. 2002, 226, 139-153.

Bagri, R, et al., "Catalytic pyrolysis ofpolyethylene" J. Anal. Pyrolysis, 2002, 63, 29-41.

Corma, A, "From Microporous to Mesoporous Molecular Sieve Materials and Their Use in Catalysis" Chem. Rev., 1997, 97, 2373-2419.

CSIC NM014—Method of preparation of mesoporous alumina with high thermal stability, http://www.serina.es/escaparate/verproducto.cgi?idproducto=4980&refcompra=NULO, downloaded Jan. 23, 2006, 2 pages.

Davis, M. E., "Ordered porous materials for emerging applications" Nature, 2002, 417, 813-821.

Davis. M. E., et al., "Zeolite and Molecular Sieve Synthesis" Chern. Mater., 1992, 4, 756-768.

de A.A. Soler-Illia, Galo, J. et al., "Chemical Strategies to Design Textured Materials from Microporous and Mesoporous Oxides to Nanonetworks and Hierarchical Structures," *Chem. Rev.*, 102:4093-4138 (2002).

de Moor P.P.E.A. et al., "Imaging the Assembly Process of the Organic-Mediated Synthesis of a Zeolite" Chern. Eur. J., 1999, 5(7), 2083-2088.

Degnan, T. F., et al., "History of ZSM-5 fluid catalytic cracking additive development at Mobile" Microporous Mesoporous Mater., 2000, 35-36, 245-252.

Galo, J. de A A, et al., "Chemical Strategies to Design Textured Materials: from Microporous and Mesoporous Oxides to Nanonetworks and Hierarchical Structures" Chern. Rev., 2002, 102, 4093-4138.

(56) References Cited

OTHER PUBLICATIONS

Geidel, E., et al., "Characterization of mesoporous materials by vibrational spectroscopic techniques" Microporous and Mesoporous Materials, 2003, 65, 31-42.

González-Peña, V. et al., "Thermally stable mesoporous alumina synthesized with non-ionic surfactants in the presence of amines", *Microporous and Mesoporous Materials*, 44-45, pp. 203-210 (2001).

Harding, R. H., et al., "New developments in FCC catalyst technology" Appl. Cata!' A: Gen., 2001, 221, 389-396.

Huang L., et al., "Investigation of Synthesizing MCM-41/ZSM-5 Composites" 1. Phys. Chem. B. 2000, 104, 2817-2823.

Karlsson, A., et al., "Composites of micro-and mesoporous materials: simultaneous syntheses of MFI/MCM-41 like phases by a mixed template approach" Microporous and Mesoporous Materials, 1999, 27, 181-192.

Kloetstra, K. R., et al., "Mesoporous material containing framework tectosilicate by pore-wall recrystallization" Chern. Commun, 1997, 23, 2281-2282.

Lee, H. et al., "Materials Science: On the Synthesis of Zeolites," *Science Week*, downloaded from http://www.scienceweek.com/2003/sa031031-1.htm on Apr. 23, 2005, 5 pgs.

Linssen, T., Cassiers, K., Cool, P., Vansant, E. F., "Mesoporous templated silicates: an overview of their synthesis, catalytic activation and evaluation of the stability" Advances in Colloid and Interface Science, 2003, 103, 121-147.

Liu, Y. et al., "Steam-Stable MSU-S Alumniosilicate Mesostructures Assembled from Zeolite ZSM-5 and Zeolite Beta Seeds" Angew. Chern. Int. Ed. 2001, 7, 1255-1258.

Lyons, D. M. et al., "Preparation of ordered mesoporous ceria with enhanced thermal stability", *The Journal of Materials Chemistry*, vol. 12, pp. 1207-1212 (2002).

"Materials Science: On the Synthesis of Zeolites", *Science Week*, downloaded from http://scienceweek.com/2003/sa031031-1.htm on Apr. 23, 2005 (5 pages).

On, D. T., et al., "Large-Pore Mesoporous Materials with Semi-Crystalline Zeolitic Frameworks" Angew. Chem. Int. Ed., 2001, 17, 3248-3251.

Park, D. W., et al., "Catalytic degradation of polyethylene over solid acid catalysts" Polym. Degrad. Stability 1999, 65, 193-198.

Prokesova, et al., "Preparation of nanosized micro/mesoporous composites via simultaneous synthesis of Beta/MCM-48 phases", Microporous and Mesoporous Materials 64 (2003) p. 165-174, no month.

Scherzer, Julius, "Octane-Enhancing Zeolitic FCC Catalysts—Scientific and Technical Aspects", *Marcel Dekker, Inc*. 1990, (42 pages).

Storck, S., et al., "Characterization of micro-and mesoporous solids by physisorption methods and pore-size analysis" Applied Catalysis A: General, 1998, 17, 137-146.

Tao et al., Mesopore-Modified Zeolites: Preparation, Characterization, and Applications, Chem. Rev., vol. 106, pp. 896-910 (2006).

Triantafyllidis et al., "Gas-oil cracking activity of hydrothermally stable aluminosilicate mesostructures (MSU-S) assembled from zeolite seeds: Effect of the type of framework structure and porosity", Catalysis Today, vol. 112, pp. 33-36 (2006).

Verhoef, et al., "Partial Transformation of MCM-41 Material into Zeolites: Formation of Nanosized MFI Type Crystallites", Chemical Materials, 2001, vol. 13, p. 683-687, no month.

Yang, P., et al., "Generalized syntheses of large-pore mesoporous metal oxides with semicrystalline frameworks" Nature, 1998, 396, 152-155.

Ying, J.Y, et al., "Synthesis and Applications of Supramolecular-Templated Mesoporous Materials" Angew. Chem. Int. Ed., 1999, 38, 56-77.

Zhang et al., "Mesoporous Aluminosilicates with Ordered Hexagonal Structure, Strong Acidity and Extraordinary Hydrothermal Stability at High Temperatures", J. of the American Chem. Society, 2001, vol. 123, p. 5014-5021, no month.

\* cited by examiner 1,3,5 TRIISOPB     1,3 DIISOPB     Cumene     Benzene

Diffusion Limited

COKE

MESOSTRUCTURED ZEOLITIC MATERIALS AND METHODS OF MAKING AND USING THE SAME

RELATED APPLICATIONS

This application is a divisional application of U.S. Ser. No. 10/830,714 filed on Apr. 23, 2004, now U.S. Pat. No. 7,589,041, the entire contents of which are incorporated herein by reference.

GOVERNMENT FUNDING

This invention was made with support under Grant Number DAAD19-02-D0002, awarded by the Army Research Office; the government, therefore, has certain rights in the invention.

BACKGROUND OF THE INVENTION

Zeolites and related crystalline molecular sieves are widely used due to their regular microporous structure, strong acidity, and ion-exchange capability. van Bekkum, H., Flanigen, E. M., Jacobs, P. A., Jansen, J. C. (editors), Introduction to Zeolite Science and Practice, 2nd edition. Studies in Surface Science and Catalysis, Vol. 137 (2001); Corma, A., Chem. Rev., 1997, 97, 2373-2419; Davis, M. E., Nature, 2002, 417, 813-821. However, their applications are limited by their small pore openings, which are typically narrower than 1 nm. The discovery of MCM-41, with tunable mesopores of 2-10 nm, overcomes some of the limitations associated with zeolites. Corma, A., Chem. Rev., 1997, 97, 2373-2419; Kresge, C. T., et al., Nature, 1992, 259, 710-712; Kosslick, H., et al., Appl. Catal. A: Gen., 1999, 184, 49-60; Linssen, T., Cassiers, K., Cool, P., Vansant, E. F., Adv. Coll. Interf. Sci., 2003, 103, 121-147. However, unlike zeolites, MCM-41-type materials are not crystalline, and do not possess strong acidity, high hydrothermal stability and high ion-exchange capability, which are important for certain catalytic applications. Corma, A., Chem. Rev., 1997, 97, 2373-2419.

Over the past 10 years, a great deal of effort has been devoted to understanding and improving the structural characteristics of MCM-41. It was found that the properties of Al-MCM-41 could be improved through (i) surface silylation, (ii) Al grafting on the pore walls to increase acidity, (iii) salt addition during synthesis to facilitate the condensation of aluminosilicate groups, (iv) use of organics typically employed in zeolite synthesis to transform partially the MCM-41 wall to zeolite-like structures, (v) preparation of zeolite/MCM-41 composites, (vi) substitution of cationic surfactants by tri-block copolymers and Gemini amine surfactants to thicken the walls, and (vii) assembly of zeolite nanocrystals into an ordered mesoporous structure. Liu, Y., Pinnavaia, T. J., J. Mater. Chem., 2002, 12, 3179-3190. In the latter approach, Liu et al. were able to prepare the first steam-stable hexagonal aluminosilicate (named MSU-S) using zeolite Y nanoclusters as building blocks. Pentasil zeolite nanoclusters were also used to produce MSU-S$_{(MFI)}$ and MSU-S$_{(BEA)}$.

Some strategies have managed to improve appreciably the acidic properties of Al-MCM-41 materials. Liu, Y., Pinnavaia, T. J., J. Mater. Chem., 2002, 12, 3179-3190; van Donk, S., et al., Catal. Rev., 2003, 45, 297-319; Kloetstra, K. R., et al., Chem. Commun., 1997, 23, 2281-2282; Corma, A., Nature, 1998, 396, 353-356; Karlsson, A., et al., Microporous Mesoporous Mater., 1999, 27, 181-192; Jacobsen, C. J. H., et al., J. Am. Chem. Soc., 2000, 122, 7116-7117; Huang L., et al., J. Phys. Chem. B., 2000, 104, 2817-2823; On, D. T., et al., Angew. Chem. Int. Ed., 2001, 17, 3248-3251; Liu, Y., et al., Angew. Chem. Int. Ed., 2001, 7, 1255-1258. However, due to the lack of long-range crystallinity in these materials, their acidity was not as strong as those exhibited by zeolites. Corma, A., Chem. Rev., 1997, 97, 2373-2419. For example, semicrystalline mesoporous materials, such as nanocrystalline aluminosilicate PNAs and Al-MSU-S$_{(MFI)}$, even being more active than conventional Al-MCM-41, showed significantly lower activity than H-ZSM-5 for cumene cracking; the catalyst activity for this reaction has usually been correlated to the Bronsted acid strength of the catalyst. Corma, A., Chem. Rev., 1997, 97, 2373-2419; Liu, Y., Pinnavaia, T. J., J. Mater. Chem., 2002, 12, 3179-3190; Kloetstra, K. R., et al., Chem. Commun., 1997, 23, 2281-2282; Jacobsen, C. J. H., et al., J. Am. Chem. Soc., 2000, 122, 7116-7117.

Previous attempts to prepare mesostructured zeolitic materials have been ineffective, resulting in separate zeolitic and amorphous mesoporous phases. Karlsson, A., et al., Microporous Mesoporous Mater., 1999, 27, 181-192; Huang L., et al., J. Phys. Chem. B., 2000, 104, 2817-2823. Moreover, some authors pointed out the difficulty of synthesizing thin-walled mesoporous materials, such as MCM-41, with zeolitic structure, due to the surface tension associated with the high curvature of the mesostructure. Liu, Y., Pinnavaia, T. J., J. Mater. Chem., 2002, 12, 3179-3190. Thus, the need exists for zeolite single crystals with ordered mesoporosity, and methods of making and using them.

SUMMARY OF THE INVENTION

In one aspect, the present invention relates to a crystalline inorganic material organized in a mesostructure. In a further embodiment, the inorganic material is a metal oxide. In a further embodiment, the inorganic material is a zeolite. In a further embodiment, the inorganic material is a zeotype. In a further embodiment, the inorganic material has a faujasite, mordenite, or ZSM-5 (MFI) structure. In a further embodiment, the mesostructure has the hexagonal pore arrangement of MCM-41. In a further embodiment, the mesostructure has the cubic pore arrangement of MCM-48. In a further embodiment, the mesostructure has the lamellar pore arrangement of MCM-50. In a further embodiment, the mesostructure has pores organized in a foam arrangement. In a further embodiment, the mesostructure has randomly placed pores.

In a further embodiment, the mesostructure is a one dimensional nanostructure. In a further embodiment, the nanostructure is a nanotube, nanorod, or nanowire.

In a further embodiment, the mesostructure is a two dimensional nanostructure. In a further embodiment, the nanostructure is a nanoslab, nanolayer, or nanodisc.

In a further embodiment, the crystalline inorganic material is Y[MCM-41], MOR[MCM-41], or ZSM-5[MCM-41].

In a further embodiment, the mean pore diameter within the mesostructure is about 2 to about 5 nm. In a further embodiment, the mean pore diameter within the mesostructure is about 2 to about 3 nm. In a further embodiment, the wall thickness within the mesostructure is about 1 to about 5 nm. In a further embodiment, the wall thickness within the mesostructure is about 1 to about 3 nm.

In another aspect, the present invention relates to a method of preparing a mesostructured zeolite comprising: a) adding a zeolite to a medium comprising an acid or base, and optionally a surfactant; b) adding a surfactant to the medium from step a) if it is not there already; c) optionally adding a swelling agent to the medium from step b); d) optionally hydrothermally treating the medium from step b) or c); and e) washing and drying the resulting material.

In a further embodiment, the resulting material is further calcined at elevated temperatures. In a further embodiment, the calcination step is performed in air or oxygen. In a further embodiment, the calcination step is performed in an inert gas. In a further embodiment, the inert gas is $N_2$. In a further embodiment, the maximum elevated temperatures are at about 500 to 600° C. In a further embodiment, the maximum elevated temperatures are at about 550° C.

In a further embodiment, the zeolite is selected from the group consisting of faujasite (FAU), mordenite (MOR), and ZSM-5 (MFI). In a further embodiment, the medium in step a) comprises a base. In a further embodiment, the base is an alkali hydroxide, alkaline earth hydroxide, $NH_4OH$ or a tetraalkylammonium hydroxide. In a further embodiment, the base is NaOH, $NH_4OH$, or tetramethylammonium hydroxide. In a further embodiment, the medium in step a) comprises an acid. In a further embodiment, the acid is HF. In a further embodiment, the surfactant is an alkylammonium halide. In a further embodiment, the surfactant is a cetyltrimethylammonium bromide (CTAB) surfactant. In a further embodiment, hydrothermally treating the medium from step b) or c) occurs at about 100 to about 200° C. In a further embodiment, hydrothermally treating the medium from step b) or c) occurs at about 120 to about 180° C. In a further embodiment, hydrothermally treating the medium from step b) or c) occurs at about 140 to about 160° C. In a further embodiment, hydrothermally treating the medium from step b) or c) occurs at about 150° C. In a further embodiment, hydrothermally treating the medium from step b) or c) takes place overnight. In a further embodiment, hydrothermally treating the medium from step b) or c) takes place over about 20 hours.

In another aspect, the present invention relates to a mesostructured zeolite prepared by any of the aforementioned methods.

In another aspect, the present invention relates to a method of preparing a mesostructured zeolite comprising: a) adding a zeolite in its acidic form to a medium comprising a base, and optionally a surfactant, in which the zeolite is partially dissolved to produce a suspension; b) adding a surfactant to the medium from step a) if it is not there already; c) optionally adding a swelling agent to the medium from step b); d) optionally hydrothermally treating the medium from step b) or c); e) washing and drying the resulting material; and f) removing the surfactant from the resulting material either by calcining at elevated temperatures, or by solvent extraction.

In another aspect, the present invention relates to a mesostructured zeolite prepared by the above method, wherein the mesostructured zeolite is in the form of a nanotube, nanorod, or nanowire.

In another aspect, the present invention relates to a mesostructured zeolite prepared by the above method, wherein the mesostructured zeolite is in the form of a nanoslab, nanolayer, or nanodisc.

In another aspect, the present invention relates to a method of anchoring a positively charged chemical species to a mesostructured zeolite comprising contacting the mesostructured zeolite and the positively charged species in a medium. In a further embodiment, the positively charged species is selected from the group consisting of cations of an element, quaternary amines, ammonium ions, pyridinium ions, phosphonium ions, and mixtures thereof.

In another aspect, the present invention relates to a method of anchoring a chemical species to a mesostructured zeolite comprising: contacting the mesostructured zeolite in its acidic form and a basic chemical species in a medium. In a further embodiment, the basic chemical species is an inorganic base or an organic base. In a further embodiment, the basic chemical species is selected from the group consisting of hydroxide, amine, pyridine, phosphine, and mixtures thereof.

In another aspect, the present invention relates to a method of anchoring a homogeneous catalyst on a mesostructured zeolite comprising: contacting a mesostructured zeolite comprising a chemical species anchored on it, and a homogeneous catalyst in a medium, wherein the anchored chemical species is capable of acting as a ligand to the homogeneous catalyst.

In another aspect, the present invention relates to a method of supporting a heterogeneous catalyst on a mesostructured zeolite comprising contacting the mesostructured zeolite and the heterogeneous catalyst by a method selected from the group consisting of physical mixture, dry impregnation, wet impregnation, incipient wet impregnation, ion-exchange, and vaporization. In a further embodiment, the heterogeneous catalyst comprises a metal or a mixture thereof. In a further embodiment, the heterogeneous catalyst comprises a metal oxide or a mixture thereof. In a further embodiment, the heterogenous catalyst comprises a nanoparticle, cluster, or colloid.

In another aspect, the present invention relates to a method of catalytically cracking an organic compound comprising contacting the organic compound with a mesostructured zeolite. In a further embodiment, the organic compound is a hydrocarbon. In a further embodiment, the organic compound is an unsaturated hydrocarbon. In a further embodiment, the organic compound is an aromatic hydrocarbon. In a further embodiment, the organic compound is an alkylated benzene. In a further embodiment, the organic compound is 1,3,5-triisopropyl benzene. In a further embodiment, the organic compound is crude oil. In a further embodiment, the organic compound is gas-oil. In a further embodiment, the organic compound is vacuum gas oil. In a further embodiment, the mesostructured zeolite has the zeolitic structure of a faujasite (FAU), mordenite (MOR), or ZSM-5 (MFI). In a further embodiment, the mesostructured zeolite has the hexagonal pore arrangement of MCM-41. In a further embodiment, the mesostructured zeolite is Y[MCM-41], MOR [MCM-41], or ZSM-5[MCM-41].

In another aspect, the present invention relates to a method of refining crude oil comprising contacting the crude oil with a mesostructured zeolite. In a further embodiment, the contacting of the oil with the mesostructured zeolite takes place within a Fluid Catalytic Cracking Unit. In a further embodiment, production of gasoline is increased relative to the amount of gasoline produced in the absence of the mesostructured zeolite. In a further embodiment, production of light olefins is increased relative to the amount of light olefins produced in the absence of the mesostructured zeolite.

In another aspect, the present invention relates to a method of catalytically degrading a polymer comprising contacting the polymer with a mesostructured zeolite. In a further embodiment, the polymer is a hydrocarbon polymer. In a further embodiment, the polymer is a poly(alkylene), poly (alkynyl) or poly(styrene). In a further embodiment, the polymer is polyethylene (PE). In a further embodiment, the mesostructured zeolite has the zeolitic structure of a faujasite (FAU), mordenite (MOR), or ZSM-5 (MFI). In a further embodiment, the mesostructured zeolite has the hexagonal pore arrangement of MCM-41. In a further embodiment, the mesopostructured zeolite is Y[MCM-41], MOR[MCM-41], or ZSM-5[MCM-41].

These embodiments of the present invention, other embodiments, and their features and characteristics, will be apparent from the description, drawings and claims that follow.

DETAILED DESCRIPTION OF THE INVENTION

Definitions

Figure 1:
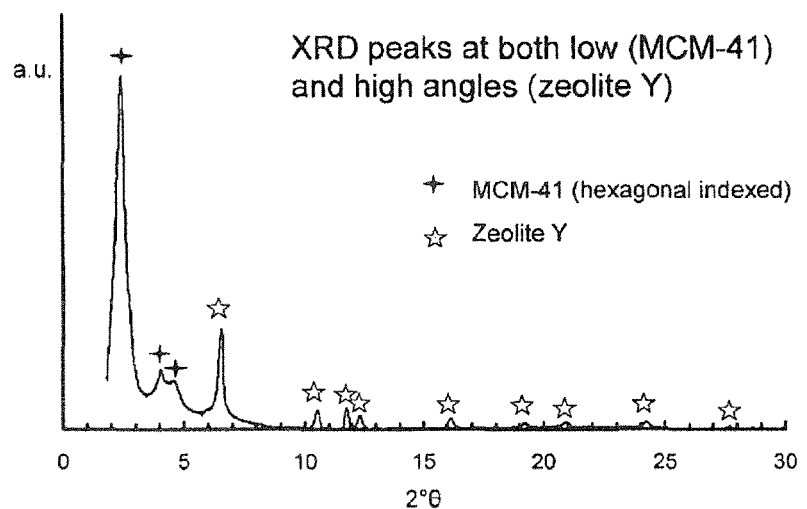
FIG. 1 depicts the X-ray diffraction pattern of the mesostructured zeolite H-Y[MCM-41]. Both the ordered mesostructure (reveled by the XRD peaks at low angles) and the zeolitic crystalline structure are present.

For convenience, before further description of the present invention, certain terms employed in the specification, examples, and appended claims are collected here. These definitions should be read in light of the remainder of the disclosure and understood as by a person of skill in the art.

The articles "a" and "an" are used herein to refer to one or more than one (i.e., at least one) of the grammatical object of the article. By way of example, "an element" means one element or more than one element.

The term "catalyst" is art-recognized and refers to any substance that notably affects the rate of a chemical reaction without itself being consumed or significantly altered.

The terms "comprise" and "comprising" are used in the inclusive, open sense, meaning that additional elements may be included.

The term "cracking" is art-recognized and refers to any process of breaking up organic compounds into smaller molecules.

The term "including" is used to mean "including but not limited to". "Including" and "including but not limited to" are used interchangeably.

"MCM-41" represents a Mobil composite of matter and refers to an amorphous mesoporous silica with a hexagonal pore arrangement, wherein the mean pore diameter is in the range of about 2-10 nm.

"MCM-48" represents a Mobil composite of matter and refers to an amorphous mesoporous silica with a cubic pore arrangement, wherein the mean pore diameter is in the range of about 2-10 mm.

"MCM-50" represents a Mobil composite of matter and refers to an amorphous mesoporous silica with a lamellar pore arrangement, wherein the mean pore diameter is in the range of about 2-10 nm.

The term "mesoporous" is art-recognized and refers to a porous material comprising pores with an intermediate size, ranging anywhere from about 2 to about 50 nanometers.

The term "mesostructure" is art-recognized and refers to a structure comprising mesopores which control the architecture of the material at the mesoscopic or nanometer scale, including ordered and non-ordered mesostructured materials, as well as nanostructured materials, i.e. materials in which at least one of their dimension is in the nanometer size range, such as nanotubes, nanorings, nanorods, nanowires, nanoslabs, and the like.

The term "mesostructured zeolites" as used herein includes all crystalline mesoporous materials, such as zeolites, aluminophosphates, gallophosphates, zincophosphates, titanophosphates, etc. Its mesostructure maybe in the form of ordered mesoporosity (as in, for example MCM-41, MCM-48 or SBA-15), non-ordered mesoporosity (as in mesocellular foams (MCF)), or mesoscale morphology (as in nanorods and nanotubes). The notation zeolite[mesostructure] is used to designate the different types of mesostructured zeolites.

"MOR" represents a mordenite which is a zeolite comprising approximately 2 moles of sodium and potassium and approximately 1 mole of calcium in its orthorhombic crystal structure. This term also includes the acidic form of MOR which may also be represented as "H-MOR."

"MSU-S (MFI)" represents a mesoporous material made with nanosized zeolites with a pore range of about 2-15 nm. The (MFI) refers to its structure.

"MSU-S (BEA)" represents a mesoporous material made with nanosized zeolites with a pore range of about 1-15 nm. The (BEA) refers to its structure.

"PNA" represents a semicrystallized form of MCM-41.

"SBA-15" represents mesoporous (alumino) silicas with pore diameters up to 30 nm arranged in a hexagonal manner and pore walls up to 6 nm thick.

The term "surfactant" is art-recognized and refers to any surface-active agent or substance that modifies the nature of surfaces, often reducing the surface tension of water. Cetyltrimethylammonium bromide is a non-limiting example of a surfactant.

"Y" represents a faujasite which is a zeolite comprising 2 moles of sodium and 1 mole of calcium in its octahedral crystal structure. This term also includes the acidic form of Y which may also be represented as "H-Y."

The term "zeolite" is defined as in the International Zeolite Association Constitution (Section 1.3) to include both natural and synthetic zeolites as well as molecular sieves and other microporous and mesoporous materials having related properties and/or structures. The term "zeolite" also refers to a group, or any member of a group, of structured aluminosilicate minerals comprising cations such as sodium and calcium or, less commonly, barium, beryllium, lithium, potassium, magnesium and strontium; characterized by the ratio (Al+Si):O=approximately 1:2, an open tetrahedral framework structure capable of ion exchange, and loosely held water molecules that allow reversible dehydration. The term "zeolite" also includes "zeolite-related materials" or "zeotypes" which are prepared by replacing $Si^{4+}$ or $Al^{3+}$ with other elements as in the case of aluminophosphates (e.g., MeAPO, SAPO, E1APO, MeAPSO, and E1APSO), gallophosphates, zincophosphates, titanosilicates, etc.

"ZSM-5" or "ZSM-5 (MFI)" represents a Mobil synthetic zeolite-5. This term also includes the acidic form of ZSM-5 which may also be represented as "H-ZSM-5." The (MFI) relates to its structure.

A comprehensive list of the abbreviations utilized by organic chemists of ordinary skill in the art appears in the first issue of each volume of the *Journal of Organic Chemistry*; this list is typically presented in a table entitled *Standard List of Abbreviations*.

For purposes of this invention, the chemical elements are identified in accordance with the Periodic Table of the Elements, CAS version, Handbook of Chemistry and Physics, 67th Ed., 1986-87, inside cover.

Contemplated equivalents of the zeolitic structures, subunits and other compositions described above include such materials which otherwise correspond thereto, and which have the same general properties thereof (e.g., biocompatible), wherein one or more simple variations of substituents are made which do not adversely affect the efficacy of such molecule to achieve its intended purpose. In general, the compounds of the present invention may be prepared by the methods illustrated in the general reaction schemes as, for example, described below, or by modifications thereof, using readily available starting materials, reagents and conventional synthesis procedures. In these reactions, it is also possible to make use of variants which are in themselves known, but are not mentioned here.

Synthesis of Mesostructured Zeolites

In recent years, expertise has been gained in the synthesis of zeolites with desired properties by the choice of the organic molecule used as structure directing agent (SDA), control of the synthesis conditions, and post-synthesis treatments. van Bekkum, H., Flanigen, E. M., Jacobs, P. A., Jansen, J. C. (editors) Introduction to Zeolite Science and Practice, 2nd edition. Studies in Surface Science and Catalysis, 2001, 137; Corma, A., Chem. Rev., 1997, 97, 2373-2419; Davis, M. E., Nature, 2002, 417, 813-821; Davis, M. E., et al., Chem. Mater., 1992, 4, 756-768; de Moor P-P. E. A. et al., Chem. Eur. J, 1999, 5(7), 2083-2088; Galo, J. de A. A., et al., Chem. Rev., 2002, 102, 4093-4138. At the same time, the family of ordered mesoporous materials has been greatly expanded by the use of different surfactants and synthesis conditions. Corma, A., Chem. Rev., 1997, 97, 2373-2419; Davis, M. E., Nature, 2002, 417, 813-821; Galo, J. de A. A., et al., Chem. Rev., 2002, 102, 4093-4138; Ying, J. Y., et al., Angew. Chem. Int. Ed., 1999, 38, 56-77. The family of mesostructured zeolites disclosed herein is a one-phase hybrid material consisting of a zeolitic structure with controlled mesoporosity, which bridges the gap between crystalline microporous and amorphous mesoporous materials.

The synthesis of mesostructured zeolites is applicable to a wide variety of materials. The first strategy is based on the short-range reorganization of a zeolite structure in the presence of a surfactant to accommodate mesoporosity without loss of zeolitic crystallinity. In an exemplary synthesis, a zeolite is added to a diluted $NH_4OH$ solution containing cetyltrimethylammonium bromide (CTAB) surfactants. The mixture is hydrothermally treated at about 100 to about 200° C., about 120 to about 180° C., about 140 to about 160° C., or about 150° C. for about 20 hr or overnight during which the zeolite structure undergoes short-range rearrangements to accommodate the MCM-41 type of mesostructure. Higher surfactant concentrations and longer hydrothermal treatments would produce mesostructured zeolites with the MCM-48 type of mesostructure. After washing and drying, the resulting material is calcined in $N_2$ at a maximum temperature from about 500 to 600° C., or at about 550° C.; and then in air for surfactant removal. This synthetic scheme could be used to produce mesostructured zeolites with various zeolitic structures. For zeolites with a low solubility (e.g. ZSM-5), a diluted tetramethyl ammonium hydroxide (TMA-OH) or a solution of HF would be used instead of a diluted $NH_4OH$ solution in the synthesis scheme.

The mesopore size and architecture may also be conveniently tuned by well-known techniques, such as the use of surfactants with different aliphatic chain lengths, non-ionic surfactants, triblock copolymers, swelling agents, etc. Also, post-synthesis treatments (e.g., silanation, grafting, surface functionalization, ion-exchange, immobilization of homogeneous catalysts and deposition of metal nanoclusters) could be employed to further improve the textural properties of the materials and/or modify their surface chemistry.

A second approach is based on the dissolution of a zeolite either in an acidic or basic medium, followed by hydrothermal treatment in the presence of a surfactant. Under these conditions, a mesoporous solid was obtained wherein the pore walls were amorphous initially. The pore walls are later transformed to a zeolitic phase, with or without affecting the mesoporous structure. Zeolitic nanorods (ZNRs) have been prepared by this approach in three steps: (i) basic treatment of a zeolite to produce a suspension of amorphous aluminosilicate, (ii) surfactant addition to produce MCM-41, and (iii) hydrothermal treatment of the resulting solid. During the last step, the MCM-41 mesostructure transformed first to MCM-48 and then to MCM-50, while their amorphous pore walls transformed to a crystalline zeolitic phase.

Zeolite-like materials, which represent a growing family of inorganic and organic/inorganic molecular sieves, may also be used as precursors for the synthesis of mesostructured zeolites, since the synthetic approaches described above may be adapted for a wide variety of materials.

Structure of Mesostructured Zeolites

Figure 2:
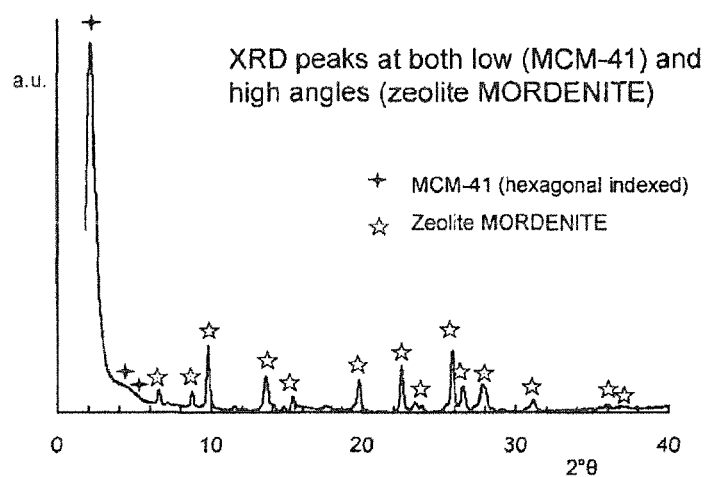
FIG. 2 depicts the X-ray diffraction pattern of the mesostructured zeolite H-MOR[MCM-41]. Both the ordered mesostructure (reveled by the XRD peaks at low angles) and the zeolitic crystalline structure are present.
Figure 3:
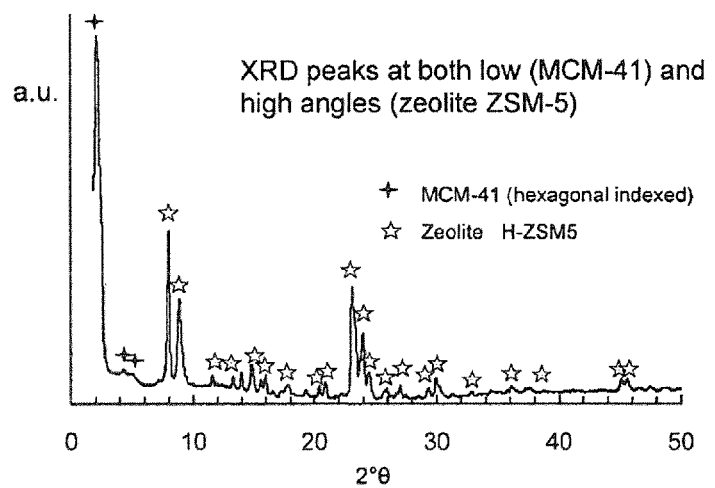
FIG. 3 depicts the X-ray diffraction pattern of the mesostructured zeolite H-ZSM-5[MCM-41]. Both the ordered mesostructure (reveled by the XRD peaks at low angles) and the zeolitic crystalline structure are present.

The hybrid structure of the mesostructured zeolites was studied via XRD. FIGS. 1-3 show the XRD patterns of H-Y[MCM-41], H-MOR[MCM-41], and H-ZSM-5[MCM-41], respectively. Very intense peaks, both at low and high 2θ° values reveal both the ordered mesostructure and the zeolitic crystallinity of this family of materials. In all cases, the peaks at low 2θ° values can be indexed to hexagonal symmetry indicating the presence of MCM-41, whereas the well-defined XRD peaks at high 2θ° values correspond, respectively, to the zeolites Y, MOR and ZSM-5. This observation is remarkable since no long-range crystallinity has been previously observed in mesoporous metal oxides and only semicrystallinity (due to the presence of zeolite nanoclusters) has been achieved in thick-wall mesoporous materials prepared using triblock copolymers. Kloetstra, K. R., et al., *Chem. Commun*, 1997, 23, 2281-2282; Liu, Y. et al., *Angew. Chem. Int. Ed.* 2001, 7, 1255-1258; On, D. T., et al., *Angew. Chem. Int. Ed.*, 2001, 17, 3248-3251.

Figure 4:
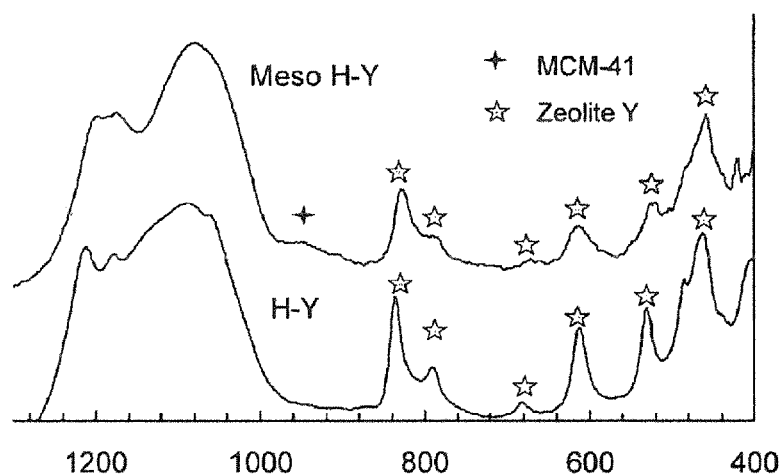
FIG. 4 depicts FTIR characterization peaks for MCM-41, zeolite Y, and Meso H-Y.
Figure 5:
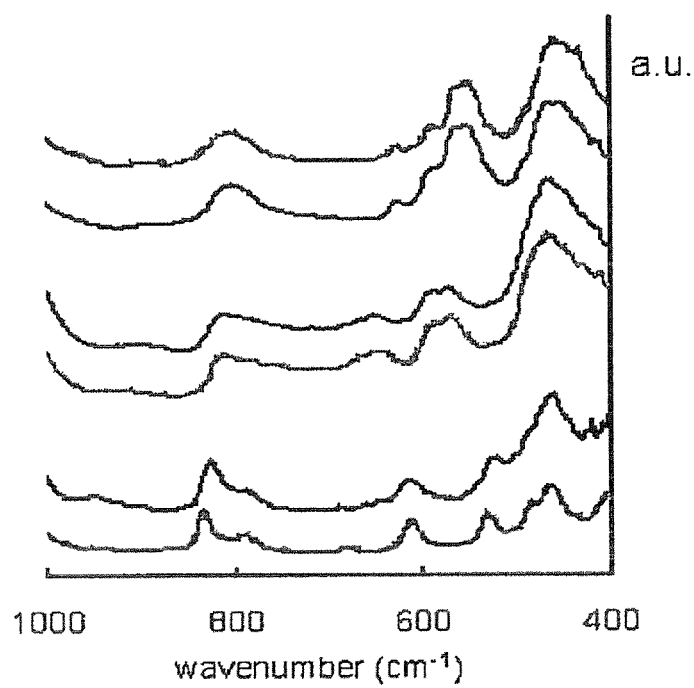
FIG. 5 depicts FTIR spectra of H-Y[MCM-41] (top), H-MOR[MCM-41] (middle), H-ZSM-5[MCM-41] (bottom) and their zeolitic versions. A match between each mesostructured zeolite and its corresponding zeolite is observed, indicating the fully zeolitic connectivity present in mesostructured zeolites.

The connectivity of the mesostructured zeolites was studied by infrared spectroscopy (FTIR) (See FIGS. 4-5). FIG. 5 shows a remarkable match between the IR spectra of H—Y[MCM-41], H-MOR[MCM-41], and H-ZSM-5[MCM-41] and those of the their corresponding zeolitic versions, contrary to highly stable Al-MCM-41, which presents only one IR broad peak, due to imperfect zeolitic connectivity. Liu, Y., Pinnavaia, T. J., *J. Mater. Chem.*, 2002, 12, 3179-3190; Kloetstra, K. R., et al., *Chem. Commun*, 1997, 23, 2281-2282; Liu, Y. et al., *Angew. Chem. Int. Ed.*, 2001, 7, 1255-1258. The peak at 960 $cm^{-1}$ in the H-Y[MCM-41] mesostructured zeolite sample, characteristic of silanol groups on the wall surfaces, is an additional evidence of the mesoporous/zeolitic hybrid nature of mesostructured zeolites. Geidel, E., et al., *Microporous and Mesoporous Materials*, 2003, 65, 31-42.

Figure 6:
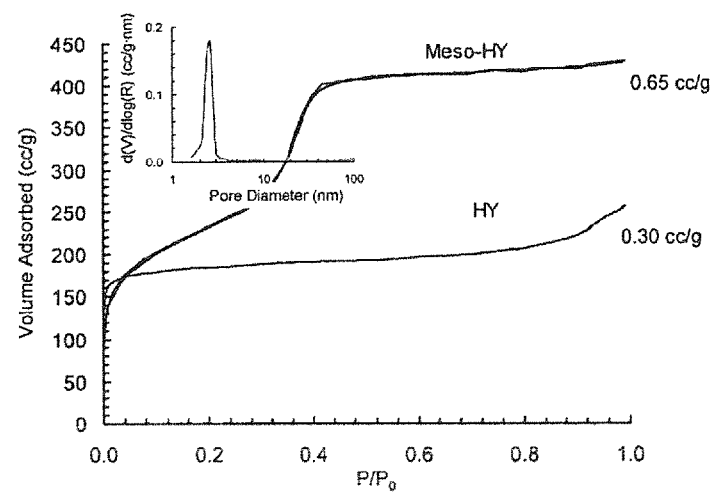
FIG. 6 depicts the physisorption isotherm of $N_2$ at 77 K of H-Y[MCM-41] and its zeolitic version. The pore size distribution (BJH method) of the mesostructured zeolite is included in inset. The presence of well developed narrow pore size mesoporosity in the mesolitic sample is evident.
Figure 7:
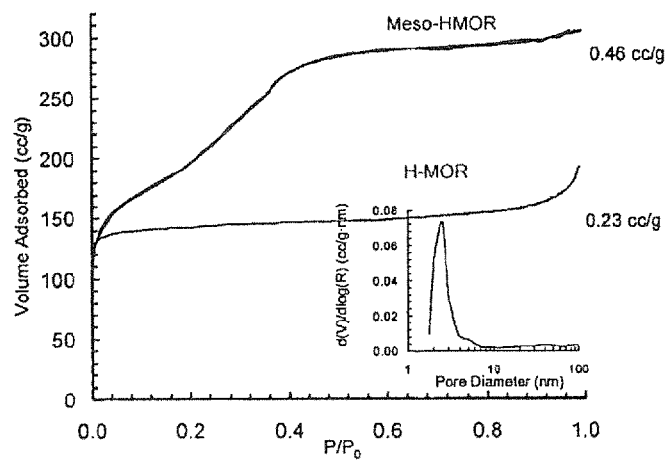
FIG. 7 depicts the physisorption isotherm of $N_2$ at 77 K of H-MOR[MCM-41] and its zeolitic version. The pore size distribution (BJH method) of the mesostructured zeolite is included in inset. The presence of well developed narrow pore size mesoporosity in the mesolitic sample is evident.
Figure 8:
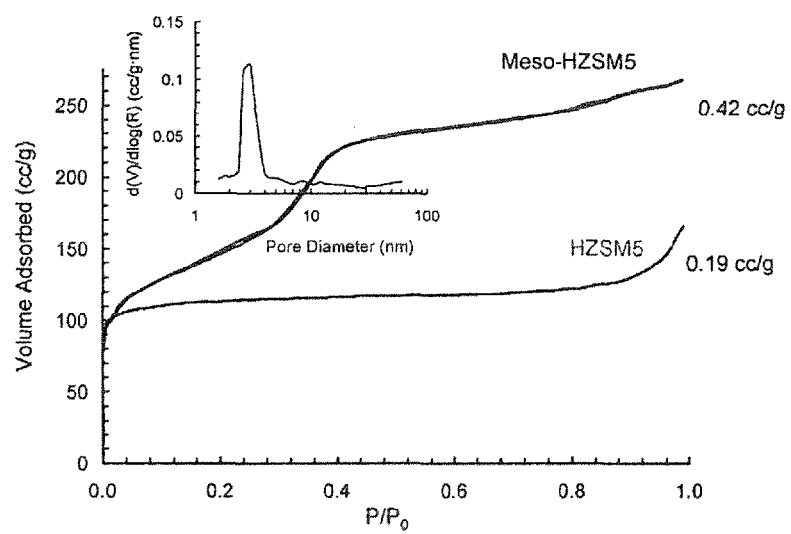
FIG. 8 depicts the physisorption isotherm of $N_2$ at 77 K of H-ZSM-5[MCM-41] and its zeolitic version. The pore size distribution (BJH method) of the mesostructured zeolite is included in inset. The presence of well developed narrow pore size mesoporosity in the mesolitic sample is evident.
Figure 9:
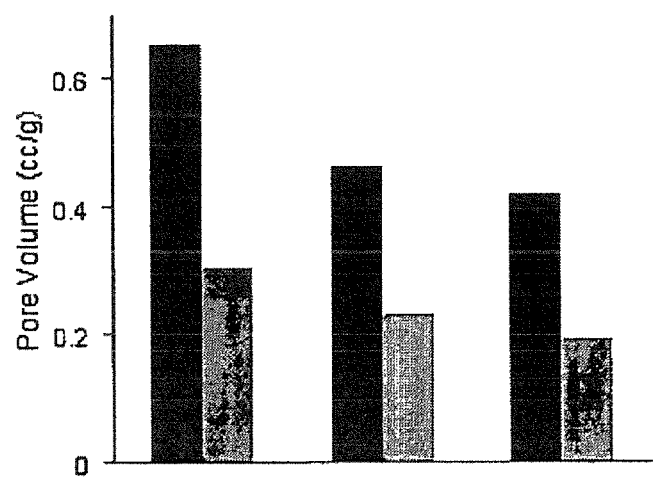
FIG. 9 depicts pore volumes (darker columns) of H-Y [MCM-41], H-MOR[MCM-41], and H-ZSM-5[MCM-41] and their zeolitic versions (lighter columns).

The presence of well-defined mesoporosity in mesostructured zeolites can be suitably studied by nitrogen physisorption at 77 K. Storck, S., et al., *Applied Catalysis A: General*, 1998, 17, 137-146. FIGS. 6-8 show the nitrogen isotherms at 77 K of H-Y[MCM-41], H-MOR[MCM-41], and H-ZSM-5 [MCM-41], respectively, and their zeolitic versions. Conventional zeolites adsorb nitrogen only at low pressures, producing type I isotherms that are characteristic of microporous materials. Storck, S., et al., *Applied Catalysis A: General*, 1998, 17, 137-146. However, the mesostructured zeolites show sharp nitrogen uptakes at higher partial pressures ($P/P_0 \sim 0.3$), which is a characteristic feature of mesostructured materials with narrow pore-size distribution (pore diameter ~2.5 nm). Storck, S., et al., *Applied Catalysis A: General*, 1998, 17, 137-146. Compared to zeolites, mesostructured zeolites have more than double the pore volume (see FIG. 9) due to the incorporation of well-developed, narrow-sized mesoporosity, mesostructured zeolites have sharper uptake at low partial pressures, which indicates the presence of microporosity, and slightly higher pore size. As well known in surfactant-templated mesoporous solids synthesis, the size of the mesopore in mesostructured zeolites can be easily tuned by changing the length of the aliphatic chain of the surfactant. Corma, A., *Chem. Rev.* 1997, 97, 2373-2419; Linssen, T., Cassiers, K., Cool, P., Vansant, E. F., *Advances in Colloid and Interface Science*, 2003, 103, 121-147; Ying, J. Y., et al., *Angew. Chem. Int. Ed.*, 1999, 38, 56-77.

Previous attempts by others to prepare zeolitic mesostructured materials led to phase separation into zeolite and amorphous mesoporous solids. Karlsson, A., et al., *Microporous and Mesoporous Materials*, 1999, 27, 181-192; Huang L., et al., *J. Phys. Chem. B.* 2000, 104, 2817-2823. Moreover, some authors pointed out the difficulty of making thin-walled mesoporous materials, such as MCM-41, with zeolitic walls, due to surface tension caused by the high curvature of the structure. Yang, P., et al., *Nature*, 1998, 396, 152-155.

Figure 10:
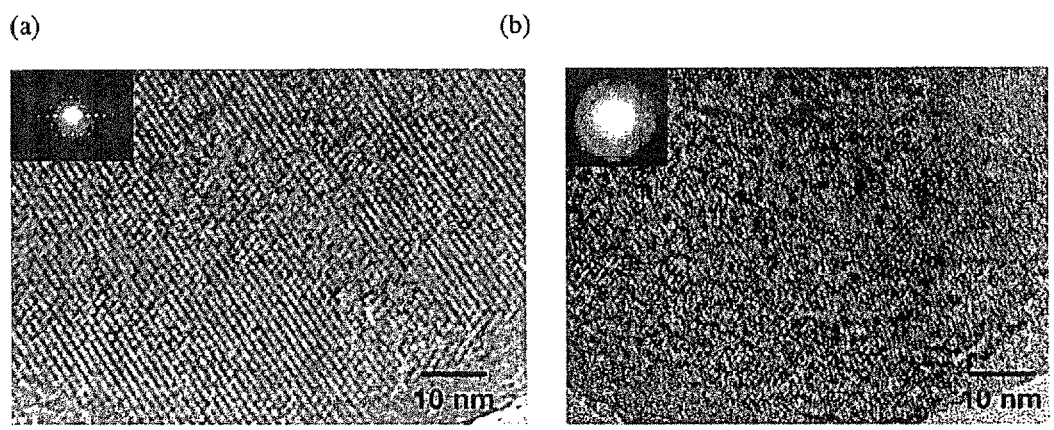
FIG. 10 depicts images obtained by transmission electron microscopic of a) detail of a H-Y[MCM-41] mesostructured zeolite, and b) detail of a H-Y[MCM-41] mesostructured zeolite at different focus. The electron diffraction patterns are included as insets.
Figure 11:
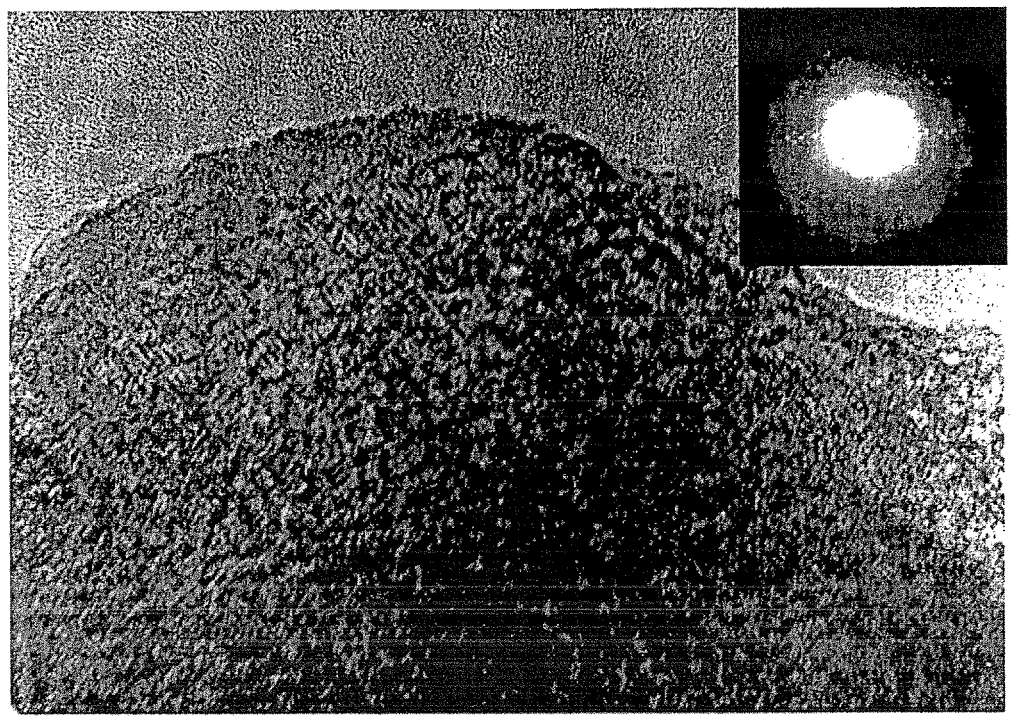
FIG. 11 depict a TEM image of a mesostructured zeolite of the present invention.
Figure 12:
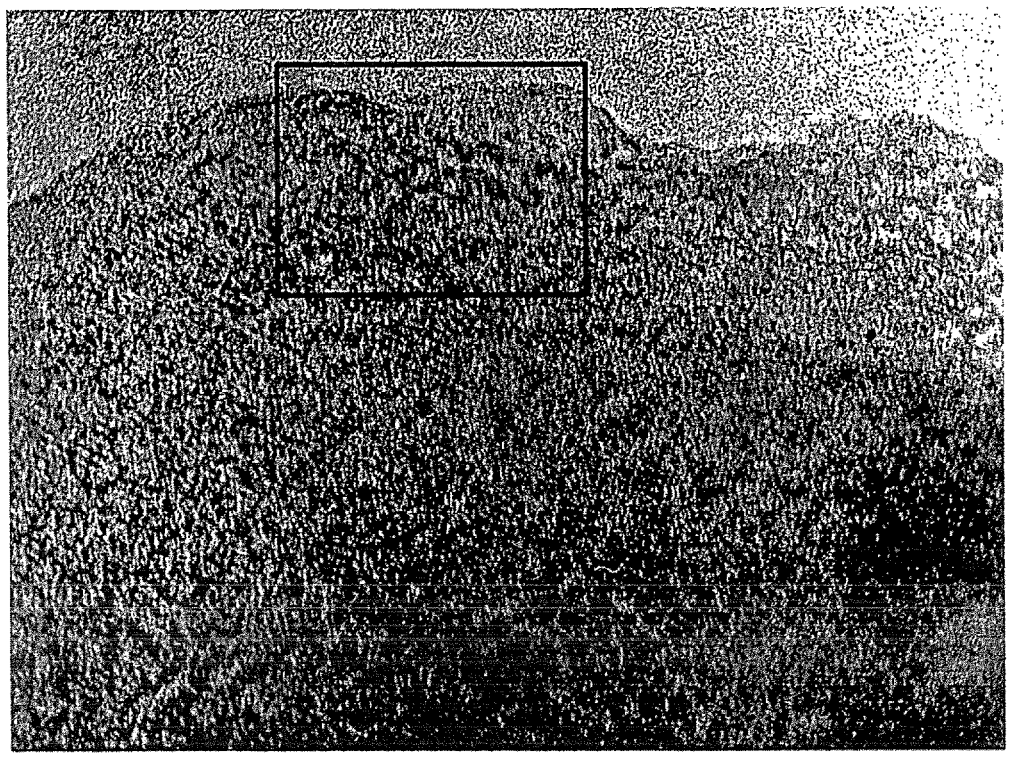
FIG. 12 depicts a TEM image of a mesostructured zeolite of the present invention.

Direct evidence for the hybrid single-phase nature of mesostructured zeolites was obtained via transmission electronic microscopy (TEM). FIGS. 10a and 10b show two details of the mesostructured zeolite microstructure at different foci in which both the crystallinity and ordered mesoporosity can be observed in a single phase. Additional TEM images are depicted in FIGS. 11-12.

Additional evidence of the hybrid nature of mesostructured zeolites comes from catalysis. The presence of mesopores, high surface, and very thin walls (~2 nm), must allow access to bulkier molecules and reduce intracrystalline diffusion. So, enhanced catalytic activity for bulky molecules must be observed in mesostructured zeolites compared to zeolites.

For example, semicrystalline mesoporous materials, such as nanocrystalline aluminosilicates PNAs and Al-MSU-S $_{(MFI)}$, shows significantly lower activity for cumene cracking (which is usually correlated to strong Bronsted acidity) than conventional H-ZSM-5. Mesostructured zeolites, however, show even greater activity than zeolites, most likely due to their fully zeolitic structure and the presence of mesopores. For example, H-ZSM-5[MCM-41] converts 98% of cumene at 300° C. whereas commercial H-ZSM-5 converts 95% in similar conditions.

The anchoring of chemical species on mesostructured zeolites was confirmed by Infrared Spectroscopy (FTIR). The pure chemical species to be anchored, the mesostructured zeolites, and the species modified mesostructured zeolites prepared according the method described herein were all analyzed by FTIR. The species modified mesostructured zeolites exhibited the FTIR bands of the chemical species which did not disappear after washing the samples.

Some of the chemical species anchored on mesostructured zeolites were used as ligands for a homogeneous catalysts. This anchoring of a homogeneous catalyst was confirmed by Infrared Spectroscopy (FTIR), and by catalytic testing of both the homogeneous catalysts and the homogeneous catalysts anchored on the mesostructured zeolite. These experiments were repeated after washing the samples and no major changes were observed, indicating that this method is suitable for anchoring both chemical species and homogeneous catalysts.

Applications

The unique structure of mesostructured zeolites will be useful to a variety of fields, and should address certain limitations associated with conventional zeolites. As catalysis is the most important field of application for zeolites, special emphasis is placed on the catalytic applications of mesostructured zeolites. van Bekkum, H., Flanigen, E. M., Jacobs, P. A., Jansen, J. C. (editors). Introduction to Zeolite Science and Practice, 2nd edition. Studies in Surface Science and Catalysis, 2001, Vol. 137; Corma, A., *Chem. Rev.* 1997, 97, 2373-2419; Davis, M. E., *Nature* 2002, 417, 813-821.

Figure 13:
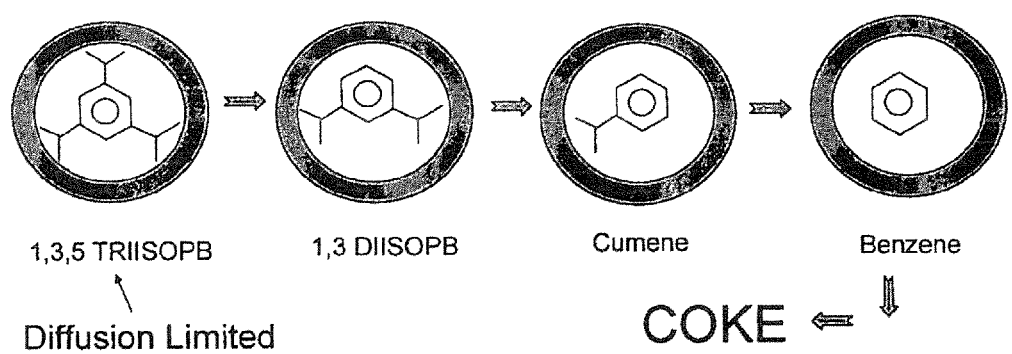
FIG. 13 depicts catalytic cracking of 1,3,5-triisopropyl benzene to benzene by zeolite HY.
Figure 14:
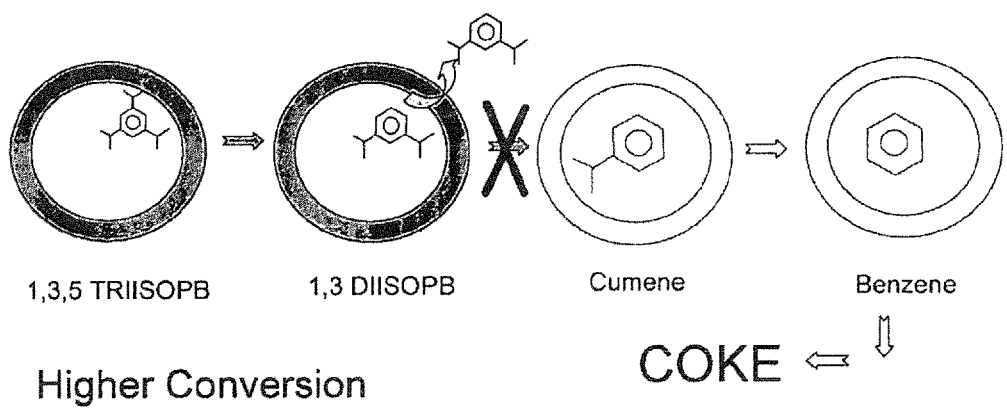
FIG. 14 depicts the process of catalytic cracking of 1,3,5-triisopropyl benzene to 1,3-diisopropyl benzene by a mesostructured zeolite of the present invention. Diisopropyl benzene was the only product detected.

The combination of a mesostructure, a high surface-area, and thin walls (~2 nm) should provide for access to bulky molecules and reduce the intracrystalline diffusion barriers. Thus, enhanced catalytic activity for bulky molecules should be observed over mesostructured zeolites, as compared to conventional zeolites. See FIGS. 13-14.

Figure 15:
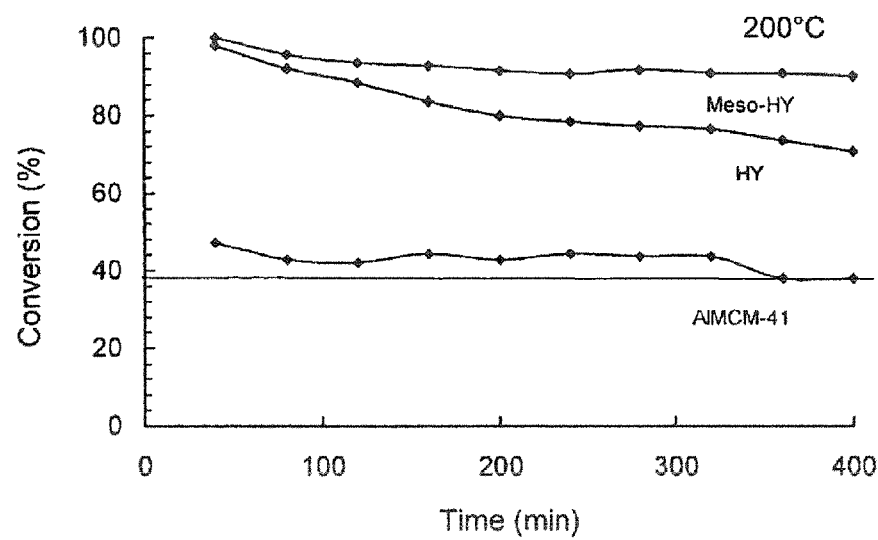
FIG. 15 depicts catalytic activity for 1,3,5-triisopropyl benzene cracking shown as conversion vs. time for H-Y [MCM-41], its zeolitic version, and a conventional Al-MCM-41. A 50 mL/min of He flow saturated with 1,3,5-triisopropylbenzene at 120° C. was flowed at 200° C. over 50 mg of catalyst.
Figure 17:
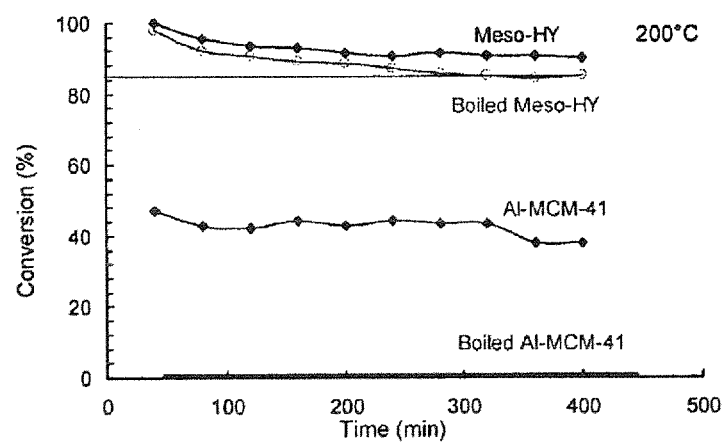
FIG. 17 depicts the hydrothermal stability of H-Y[MCM-41] compared to the non-mesolytic zeolite Al-MCM-41.

Acid catalysts with well-defined ultralarge pores are highly desirable for many applications, especially for catalytic cracking of the gas oil fraction of petroleum, whereby slight improvements in catalytic activity or selectivity would translate to significant economic benefits. Venuto, P. B., Habib, E. T., Jr. Fluid Catalytic Cracking with Zeolite Catalysts. Marcel Dekker, New York, 1979; Harding, R. H., et al., *Appl. Catal. A: Gen.*, 2001, 221, 389-396; Degnan, T. F., et al., *Microporous Mesoporous Mater.*, 2000, 35-36, 245-252. As a test reaction, we have examined the catalytic cracking of 1,3,5-triisopropylbenzene (critical dimension ~0.95 nm). The H-Y[MCM-41] mesostructured zeolite demonstrated superior catalytic activity for this cracking reaction after 400 min at 200° C. (93% conversion) compared to the H-Y zeolite (71% conversion) and the mesoporous Al-MCM-41 (39% conversion) (see FIG. 15). This result was attributed to its combination of strong acidity and mesostructured nature. The mesopores greatly facilitated the hydrocarbon diffusion within the H-Y[MCM-41] catalyst. The H-Y[MCM-41] mesostructured zeolite also maintained its physicochemical integrity even after being boiled for several days, exhibiting a high 1,3,5-triisopropylbenzene activity (87% conversion after 400 min) even after such severe treatment. See FIG. 17. This outcome illustrated the superior hydrothermal stability of H-Y[MCM-41] over the amorphous Al-MCM-41 catalyst, which lost its activity and ordered mesostructure after exposure to similar conditions.

Figure 19:
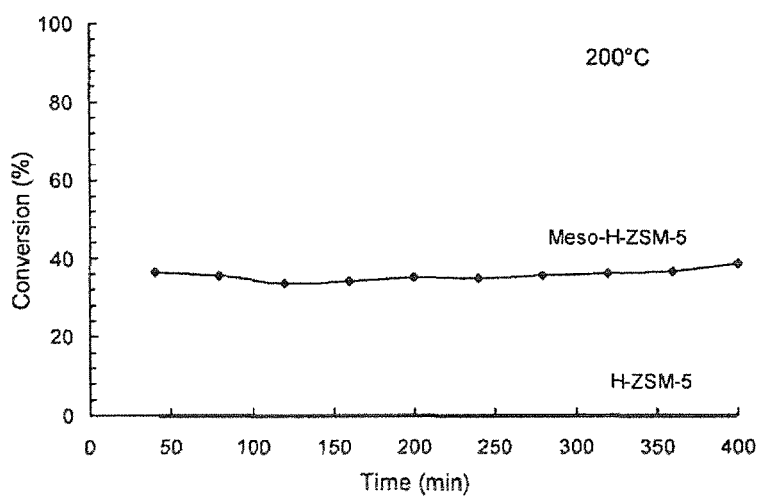
FIG. 19 depicts catalytic activity for 1,3,5-triisopropyl benzene cracking shown as conversion vs. time for H-ZSM-5[MCM-41], and its zeolitic version. A 50 mL/min of He flow saturated with 1,3,5-triisopropylbenzene at 120° C. was flowed at 200° C. over 50 mg of catalyst.

H-ZSM-5 is used as an important additive in cracking catalysts to increase propylene production and improve octane number in gasoline. Degnan, T. F., et al., *Microporous Mesoporous Mater.*, 2000, 35-36, 245-252. However, due to its small pores, it is inactive in 1,3,5-triisopropylbenzene cracking at 200° C. (<1% conversion after 400 min). The incorporation of MCM-41 mesostructure in this zeolite (H-ZSM-5 [MCM-41]) successfully achieved substantial activity, with 40% conversion after 400 min (see FIG. 19). In this case, the activity was attributed to the mesopores and strong acidity of the mesostructured zeolite.

Figure 18:
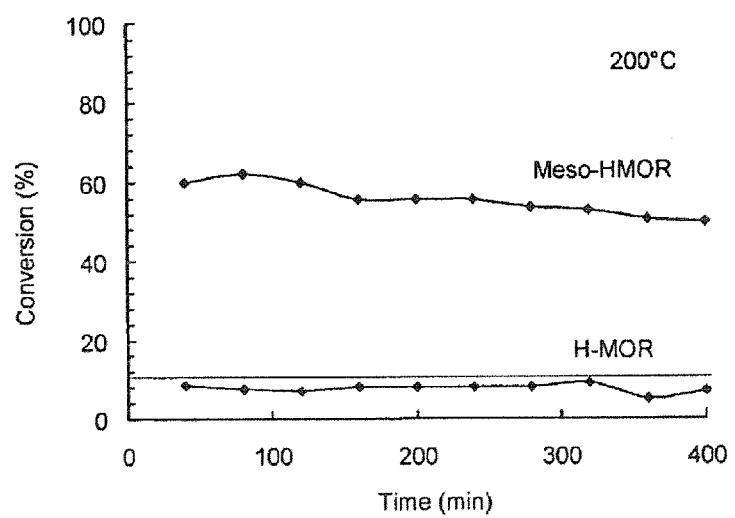
FIG. 18 depicts catalytic activity for 1,3,5-triisopropyl benzene cracking shown as conversion vs. time for H-MOR [MCM-48], and its zeolitic version. A 50 mL/min of He flow saturated with 1,3,5-triisopropylbenzene at 120° C. was flowed at 200° C. over 50 mg of catalyst.

More than 135 different zeolitic structures have been reported to date, but only about a dozen of them have commercial applications, mostly the zeolites with 3-D pore structures. Corma, A., *Chem. Rev.*, 1997, 97, 2373-2419; Davis, M. E., *Nature*, 2002, 417, 813-821. The incorporation of 3-D mesopores would be especially beneficial for zeolites with 1-D and 2-D pore structures as it would greatly facilitate intracrystalline diffusion. To illustrate the potential of mesostructure processing of zeolites with low pore interconnectivity, H-MOR with 1-D pores were prepared with MCM-48 mesostructure. The resulting H-MOR[MCM-48] with 3-D mesostructured structures was examined for the catalytic cracking of 1,3,5-triisopropylbenzene at 200° C. It exhibited 50% conversion after 400 min, which was significantly higher compared to the 7% conversion achieved by H-MOR (see FIG. 18).

Figure 16:
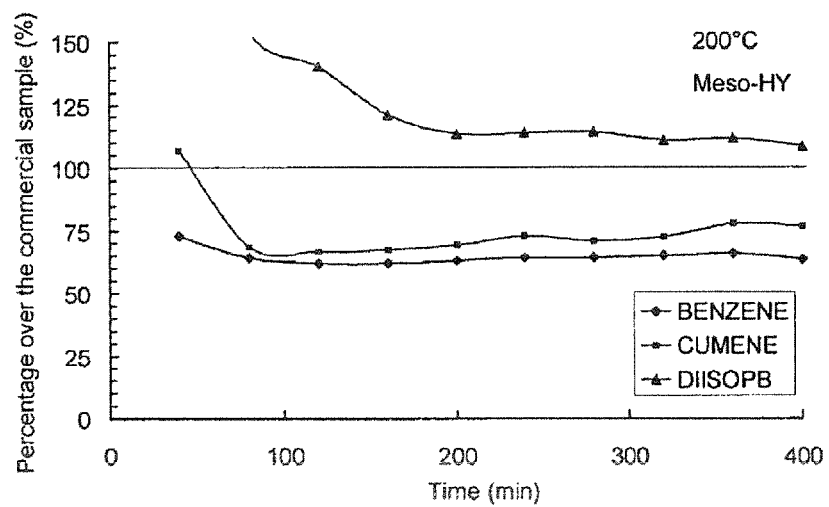
FIG. 16 depicts the catalytic cracking of 1,3,5-triisopropyl benzene with H-Y[MCM-41] to diisopropyl benzene and cumene. Compared to a commercial sample, catalytic cracking with H-Y[MCM-41] results in higher selectivity and reduction in benzene production.

Mesostructured zeolites not only showed much higher catalytic activity, but also enhanced selectivity. For example, H-Y[MCM-41] mesostructured zeolite produced only 75% of the benzene generated by the H-Y zeolite. See FIG. 16. Benzene is a toxic compound whose presence in gasoline is being increasingly restricted by legislation. Degnan, T. F., et al., *Microporous Mesoporous Mater.*, 2000, 35-36, 245-252. The benzene production was even lower in the case of H-MOR[MCM-48], and was minimal in the case of H-ZSM-5[MCM-41]. The decrease in benzene production has been observed in small zeolite crystals, and was related to the intrinsic ability of crystals with higher surface areas to limit successive cracking reactions. Al-Khattaf, S., et al., *Appl. Catal. A: Gen.* 2002, 226, 139-153. It also reduced the formation of coke, which was the undesired end-product of the cracking process that was responsible for catalyst deactivation. Thus, the mesostructured zeolites not only provided for higher catalytic activity and selectivity, but also longer catalyst life time.

Figure 20:
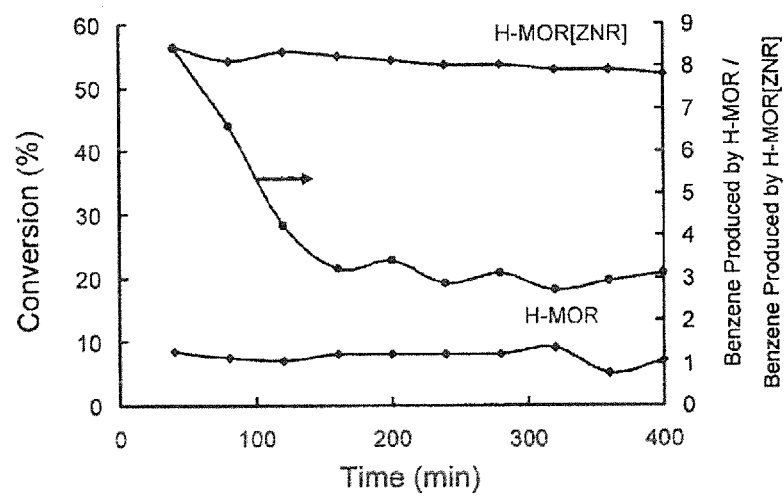
FIG. 20 depicts the conversion of 1,3,5-triisopropylbenzene versus time for H-MOR[ZNR] and H-MOR. The ratio benzene produced by H-MOR/benzene produced by H-MOR [ZNR] as a function of time is also shown. A helium flow of 50 mL/min saturated with 1,3,5-triisopropylbenzene at 120° C. was introduced over 50 mg of catalyst at 200° C.

Zeolitic nanorods (ZNRs), another form of mesostructured zeolite, also enhance catalytic activity by increasing active-site accessibility. The rod-shape ZNRs are only nanometer-sized in diameter, so internal diffusional resistance is minimal. These new mesostructured zeolites were tested as cracking catalysts for the gas oil fraction of petroleum to assess their potential. In the cracking of 1,3,5-triisopropylbenzene, the conventional H-MOR zeolite showed a low activity (7% conversion after 400 min) due to its medium-sized (0.65×0.70 nm), 1-D pores. In contrast, H-MOR[ZNR] achieved a much higher catalytic activity under similar conditions (~52% conversion) (see FIG. 20). This significant increase in catalytic activity was attributed to ZNRs' higher surface areas, readily accessible active sites, and improved intracrystalline diffusivity.

Besides increased activity, ZNRs also showed improved selectivity due to their nanostructured rod-shape morphology. For example, H-MOR[ZNR] produced 3 times less benzene per mole of 1,3,5-triisopropylbenzene converted as compared to commercial H-MOR (see FIG. 20). This significant increase in selectivity also helped to reduce coke formation, which has been a major problem with conventional cracking catalysts, especially those containing 1-D pores, such as mordenite.

The simple, inexpensive and generalized synthesis strategy described here allows for the preparation of ZNR, a crystalline material with walls that are only several nanometers thick (3-20 nm), in which nanorings and junctions are common. The novel synthesis strategy was based on the "programmed" zeolitic transformation of mesoporous materials, which avoided the typical drawbacks of nanoscaled zeolite synthesis (e.g., low yield, difficulty in separation, and high pressure drops), and did not require the use of a layered precursor. The unique crystalline structure of ZNRs provided for improved catalytic conversion of bulky molecules by increasing the accessibility to its microporosity, while reducing interparticle and intraparticle diffusion barriers.

Mesostructured zeolites were tested for crude oil refining via Microactivity Test (ASTM D-3907). This is a well known and widely accepted technique to estimate the performance of FCC (Fluid Catalytic Cracking) catalysts. Vacuum gas-oil was used as feed in a fluid-bed stainless steel reactor. The experiments were conducted under identical conditions with mesostructured zeolites and their conventional zeolites counterparts. The samples were displayed in a fluidized-bed stainless steel reactor. Reaction temperature was 500° C., the amount of catalyst was 3.0 g, the catalyst/oil ratio was 2.0, the WHSV was 30 g/h/g, and the contact time was 60 seconds. These tests showed that using HY[MCM-41] in place of conventional HY resulted in a 43% increase in gasoline production, a 75% increase in propylene and a 110% increase in butenes. Additionally, there is a 32% decrease in coke formation, a 23% decrease in Total Dry Gas, and a 12% decrease in LPG (Liquified Petroleum Gases). The presence of mesopores in the HY[MCM-41], which has double the surface area of HY, favours the cracking of the larger molecules present in the crude oil, which cannot be transformed within the micropores of conventional zeolites. The increase of light olefins was related to the reduction of hydrogen transfer reaction due to the presence of thin walls in mesostructured zeolites (~2 nm) as opposed to the thick crystals of conventional zeolites (~1000 nm). This wall thickness also results in reduction of overcracking, significantly reduces coke formation, and reduces production of Total Dry Gas and LPG.

Pyrolysis of plastics has gained renewed attention due to the possibility of converting these abundant waste products into valuable chemicals while also producing energy. Williams, P. T. Waste Treatment and Disposal; John Wiley and Sons, Chichester, UK, 1998. Acidic catalysts, such as zeolites, have been shown to be able to reduce significantly the decomposition temperature of plastics and to control the range of products generated. Williams, P. T. Waste Treatment and Disposal. John Wiley and Sons, Chichester, UK, 1998; Park, D. W., et al., *Polym. Degrad. Stability* 1999, 65, 193-198; Bagri, R., et al., *J. Anal. Pyrolysis,* 2002, 63, 29-41. However, the accessibility of the bulky molecules produced during plastic degradation has been severely limited by the micropores of zeolites.

The catalytic degradation of polyethylene (PE) by commercially available zeolites and their corresponding mesostructured zeolites was studied by thermal gravimetric analysis (TGA). In all cases, mesostructured zeolites allowed for reduced decomposition temperatures compared to the commercial zeolites (by ~35° C. in the case of H-ZSM-5[MCM-41] vs. H-ZSM-5), even at high catalyst/PE ratios (see FIG. 21). In fact, at a PE/H-ZSM-5[MCM-41] weight ratio of 1:1, a lower decomposition temperature was achieved compared to that required by a PE/ZSM-5 weight ratio of 1:2.

The large accessible surface area and ion-exchange properties of mesostructured zeolites will also facilitate the surface functionalization, the immobilization of homogeneous catalysts, and the deposition of metal clusters. Thus, mesostructured zeolites also serve as a very useful catalyst support for a variety of reactions.

With their improved accessibility and diffusivity compared to conventional zeolites, mesostructured zeolites may also be employed in place of zeolites in other applications, such as gas and liquid-phase adsorption, separation, catalysis, catalytic cracking, catalytic hydrocracking, catalytic isomerization, catalytic hydrogenation, catalytic hydroformylation, catalytic alkylation, catalytic acylation, ion-exchange, water treatment, pollution remediation, etc. Many of these applications suffer currently from limitations associated with the small pores of zeolites, especially when bulky molecules are involved. van Bekkum, H., Flanigen, E. M., Jacobs, P. A., Jansen, J. C. (editors), Introduction to Zeolite Science and Practice, 2nd edition. Studies in Surface Science and Catalysis, Vol. 137, 2001; Corma, A., *Chem. Rev.,* 1997, 97, 2373-2419; Davis, M. E., *Nature,* 2002, 417, 813-821. Mesostructured zeolites present attractive benefits over zeolites in such applications.

Organic dye and pollutant removal from water is of major environmental importance, and represents the third major use of zeolites (accounting for 80 tons of zeolites per year). Galo, J. de A. A., et al., *Chem. Rev.* 2002, 102, 4093-4138. However, most of the organic dyes are bulky, which make their removal slow or incomplete, requiring a huge excess of zeolites in the process. Mesostructured zeolites offer significant advantage over zeolites in organic dye and pollutant removal with their larger surface area and pore size.

Kits

This invention also provides kits for conveniently and effectively implementing the methods of this invention. Such kits comprise any of the zeolitic structures of the present invention or a combination thereof, and a means for facilitating their use consistent with methods of this invention. Such kits provide a convenient and effective means for assuring that the methods are practiced in an effective manner. The compliance means of such kits includes any means which facilitates practicing a method of this invention. Such compliance means include instructions, packaging, and dispensing means, and combinations thereof. Kit components may be packaged for either manual or partially or wholly automated practice of the foregoing methods. In other embodiments involving kits, this invention contemplates a kit including block copolymers of the present invention, and optionally instructions for their use.

EXEMPLIFICATION

The invention now being generally described, it will be more readily understood by reference to the following examples, which are included merely for purposes of illustration of certain aspects and embodiments of the present invention, and are not intended to limit the invention.

EXAMPLE 1

Synthesis of H-Y[MCM-41]

0.79 g of H-Y (Zeolyst CBV-720 Si/Al=15) were stirred in 50 mL of a 0.37 M $NH_4OH$ solution containing 0.55 g of CTAB, for 20 minutes, after which time the synthesis mixture was hydrothermally treated at 150° C. for 10 hours. The solid was filtered, washed, and finally ramped in nitrogen at 5° C./min until 550° C., and then switched to air for 4 hours. Similar conditions were used to calcine all of the samples. Alternatively, 1 g of H-Y (Zeolyst CBV-720 Si/Al=15) was stirred for in 30 mL of a 0.09 M tetramethylammonium hydroxide (TMA-OH) solution. Then 0.5 g of cetyltrimethylammonium bromide (CTAB) was added. After 30 minutes of stirring the suspension was hydrothermally treated for 20 hours at 150° C. Structural parameters are presented in Table 1.

EXAMPLE 2

Synthesis of H-MOR[MCM-41]

2.0 g of H-MOR (calcined Zeolyst CBV21A Si/Al=10) was stirred in 50 mL of 0.27 M TMA-OH solution. Afterwards, 1.0 g of CTAB was added. After other 30 minutes of stirring the synthesis solution was hydrothermally treated at 150° C. for 20 hours. Structural parameters are presented in Table 1.

EXAMPLE 3

Synthesis of H-ZSM-5[MCM-41]

1.0 g of $NH_4$-ZSM-5 (Zeolyst CBV3024E Si/Al=15) was stirred in 50 mL of 0.8 M HF solution for 4 hours. This suspension was added to a solution containing 0.69 g of CTAB, and stirred for 30 minutes. The resulting synthesis mixture was basified by slowly adding 2.5 g of a 30% $NH_4OH$ solution. Finally, it was hydrothermally treated at 150° C. for 20 hours. Structural parameters are presented in Table 1. The wall thickness was determined by the standard method within the art by subtracting the distance between two pore centers ($a_o$, obtained via X-ray diffraction) and the pore size (determined by $N_2$ adsorption).

TABLE 1

Structural parameters for the mesostructured zeolites.

| | $a_o$ (nm) | Pore diameter (nm) | Wall thickness (nm) |
|---|---|---|---|
| H-Y[MCM-41] | 4.2 | 2.6 | 1.6 |
| H-MOR[MCM-41] | 4.7 | 2.5 | 2.2 |
| H-ZSM-5[MCM-41] | 4.8 | 2.6 | 2.2 |

EXAMPLE 4

Catalytic Cracking of Cumene and 1,3,5-Triisopropylbenzene

Catalytic tests were carried out in a lab-scale packed-bed catalytic reactor connected to a gas chromatograph (Hewlett Packard HP6890 Series) with a DB petrol (50 m×0.2 mm×0.5 microns) column. In all cases, 50 mL/min of He were flowed through 50 mg of catalyst. For cumene cracking the gas flow was saturated with cumene at room temperature and the reaction temperature was 300° C. For 1,3,5-triisopropylbenzene cracking the gas flow was saturated at 120° C. and the reaction temperatures were 300° C.

EXAMPLE 5

Polyethylene (PE) Degradation

Figure 21:
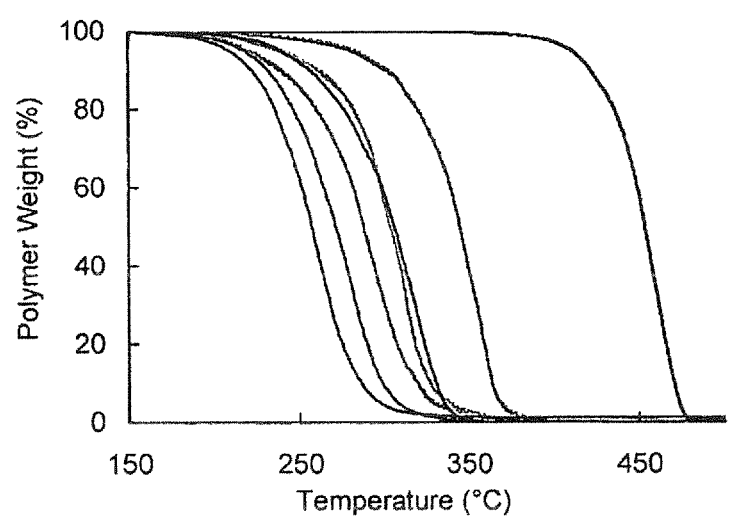
FIG. 21 depicts percentage of polyethylene (PE) weight lost vs. temperature for the mixtures PE: catalysts: 2:1 wt., 1:1 wt., and 1:2 wt., for H-ZSM-5[MCM-41] and H-ZSM-5.

An initial mass of ~10 mg of catalyst: PE samples with ratios 1:2, 1:1, and 2:1 were ramped in a thermogravimetric analyzer (Perkin Elmer TGA7) at 10° C./min in a 250 mL/min flow of He until 600° C. Results are depicted in FIG. 21.

EXAMPLE 6

Chemical Species and Homogeneous Anchoring on Mesostructured Zeolites

Figure 22:
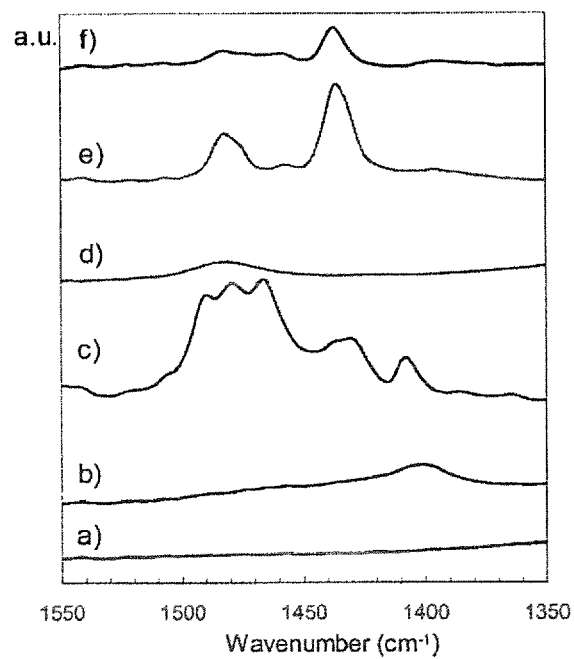
FIG. 22 depicts the FTIR spectra of a) H-Y[MCM-41], b) $NH_4$-Y[MCM-41], c) $NH_2(CH_2)_2NMe_3Cl$, d) $NH_2(CH_2)_2NMe_3$-Y[MCM-41], d) $Rh(PPh_3)_3Cl$, and e) $Rh(PPh_3)_3NH_2(CH_2)_2NMe_3$-Y[MCM-41].

The acid form of the mesostructured zeolite with faujasite structure and MCM-41 architecture, H-Y[MCM-41], (Si/Al~15), was ion exchanged in a 0.1 M $NH_4OH$ solution for 24 h in order to produce $NH_4$-Y[MCM-41]. The resulting material was ion-exchanged again in a 7.0 mM $NH_2(CH_2)_2$ $NMe_3Cl$ solution for 24 h. After filtering and washing thoroughly, the sample was dried at 60° C. overnight. Finally, this amine functionalized mesostructured zeolite was added to a 2.0 mM $Rh(PPh_3)_3$ solution (Wilkinson catalyst) for 24 h. After filtering and washing thoroughly, the sample was dried at 60° C. overnight. All the products, as well as the quarternary amine and the Wilkinson catalyst, were analyzed by FTIR to confirm the presence of the different species on the mesostructured zeolite even after thorough washing (see FIG. 22).

INCORPORATION BY REFERENCE

All of the patents and publications cited herein are hereby incorporated by reference.

EQUIVALENTS

Those skilled in the art will recognize, or be able to ascertain using no more than routine experimentation, many equivalents to the specific embodiments of the invention described herein. Such equivalents are intended to be encompassed by the following claims.

We claim:

1. A material comprising at least one mesostructured crystalline inorganic one-phase hybrid single crystal material having long-range crystallinity and comprising a plurality of mesopores, wherein said crystalline inorganic material is selected from the group consisting of zeolites, zeolite-related materials, zeotypes, metal oxides, molecular sieves, and combinations thereof.

2. The material of claim 1, wherein the crystalline inorganic material is a metal oxide, a zeolite, a zeotype or any combination thereof.

3. The material of claim 1, wherein the crystalline inorganic material has a faujasite (FAU), mordenite (MOR), or ZSM-5 (MFI) structure.

4. The material of claim 1, wherein the crystalline inorganic material has a mesostructure that comprises mesopores having the hexagonal pore arrangement of MCM-41, the cubic pore arrangement of MCM-48, or the lamellar pore arrangement of MCM-50.

5. The material of claim 1, wherein the crystalline inorganic material has a mesostructure that comprises mesopores organized in a foam arrangement.

6. The material of claim 1, wherein the crystalline inorganic material has a mesostructure that comprises mesopores that are randomly placed pores.

7. The material of claim 1, wherein the crystalline inorganic material has a mesostructure that is a one dimensional nanostructure.

8. The material of claim 7, wherein the nanostructure is a nanotube, nanorod, or nanowire.

9. The material of claim 1, wherein the crystalline inorganic material has a mesostructure that is a two dimensional nanostructure.

10. The material of claim 9, wherein the nanostructure is a nanoslab, nanolayer, or nanodisc.

11. The material of claim 1, wherein the crystalline inorganic material comprises mesopores defining a mesostructure of Y[MCM-41], MOR[MCM-41], or ZSM-5 [MCM-41].

12. The material of claim 1, wherein the mesopores have a mean pore diameter from about 2 to about 5 nm.

13. The material of claim 1, wherein the wall thickness between mesopores is in the range of from about 1 to about 5 nm.

14. The material of claim 1 further comprising a chemical species anchored to at least a portion of the crystalline inorganic material.

15. The material of claim 14 wherein the anchored chemical species is positively charged.

16. The material of claim 1, wherein the crystalline inorganic material has a mesostructure that includes a plurality of mesopores that have a pore size diameter distribution having a range of from about one half to about double the average pore size diameter.

17. The material of claim 1, wherein the crystalline inorganic material is a faujasite.

18. The material of claim 1, wherein the crystalline inorganic material has a mesoporous volume adsorption of at least about 0.05 cc/g.

19. The material of claim 1, wherein the crystalline inorganic material has a mesoporous volume adsorption of at least about 0.1 cc/g.

20. The material of claim 1, wherein the crystalline inorganic material has a mesoporous volume adsorption of at least about 0.2 cc/g.

21. A method for producing a gasoline product comprising: contacting a crude oil with the material of claim 1 under conditions sufficient to crack at least a portion of said crude oil to thereby form said gasoline product or a precursor thereto.

22. A method of producing a light olefin product comprising: contacting a crude oil with the material of claim 1 under conditions sufficient to crack at least a portion of said crude oil to thereby form said light olefin product or a precursor thereto.

23. A method of catalytically degrading a polymer comprising contacting the polymer with the material of claim 1 under conditions sufficient to at least partially degrade said polymer.

24. The method of claim 23, wherein the polymer is a hydrocarbon polymer.

25. The method of claim 23, wherein the polymer is a poly(alkylene), poly(alkynyl) or poly(styrene).

26. The method of claim 23, wherein the polymer is polyethylene (PE).

27. The material of claim 1 wherein the crystalline inorganic molecular sieve is an aluminophosphate, a gallophsophate, a zincophosphate, a titanophosphate, or any combination thereof.

28. A material comprising at least one mesostructured microporous crystalline inorganic one-phase hybrid single crystal material having long-range crystallinity and comprising a plurality of mesopores, wherein said mesostructured microporous crystalline inorganic material is selected from the group consisting of zeolites, zeolite-related materials, zeotypes, metal oxides, molecular sieves, and combinations thereof.

29. A material comprising at least one mesostructured acidic crystalline inorganic one-phase hybrid single crystal material having long-range crystallinity and comprising a plurality of mesopores, wherein said mesostructured acidic crystalline inorganic material is selected from the group consisting of zeolites, zeolite-related materials, zeotypes, metal oxides, molecular sieves, and combinations thereof.

* * * * *